(12) United States Patent
Murikipudi et al.

(10) Patent No.: US 10,169,408 B1
(45) Date of Patent: Jan. 1, 2019

(54) SYSTEMS AND METHODS FOR NON-DISRUPTIVE COMPLEX VARIABLE CALCULATION IN ONLINE ENVIRONMENTS

(71) Applicant: The Travelers Indemnity Company, Hartford, CT (US)

(72) Inventors: Syam S. Murikipudi, Elkridge, MD (US); Christine L. Steben, Avon, CT (US)

(73) Assignee: The Travelers Indemnity Company, Hartford, CT (US)

( * ) Notice: Subject to any disclaimer, the term of this patent is extended or adjusted under 35 U.S.C. 154(b) by 119 days.

(21) Appl. No.: 15/480,691

(22) Filed: Apr. 6, 2017

(51) Int. Cl.
*G06F 17/30* (2006.01)
*G06Q 30/04* (2012.01)
*G06F 17/00* (2006.01)

(52) U.S. Cl.
CPC .. *G06F 17/30424* (2013.01); *G06F 17/30339* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 8,924,429 B1* | 12/2014 | Fisher | ...................... | G06F 7/24 707/695 |
| 2002/0055900 A1* | 5/2002 | Kansal | ............... | G06Q 10/0639 705/37 |
| 2003/0236745 A1* | 12/2003 | Hartsell | ............... | G06Q 20/102 705/40 |
| 2006/0059068 A1* | 3/2006 | Glinberg | ................ | G06Q 40/00 705/35 |
| 2007/0118643 A1* | 5/2007 | Mishra | .................. | H04L 41/082 709/224 |
| 2008/0208897 A1* | 8/2008 | Lew | .................. | G06F 17/30539 |
| 2011/0295722 A1* | 12/2011 | Reisman | ............ | G06Q 30/0201 705/27.1 |
| 2014/0280952 A1* | 9/2014 | Shear | ...................... | H04L 47/70 709/226 |
| 2014/0288714 A1* | 9/2014 | Poivet | .................... | G05B 15/02 700/275 |
| 2015/0033305 A1* | 1/2015 | Shear | ...................... | G06F 21/45 726/11 |
| 2016/0034305 A1* | 2/2016 | Shear | ........................ | G06F 9/50 707/722 |
| 2016/0203509 A1* | 7/2016 | Sharp, III | .......... | G06Q 30/0244 705/14.43 |
| 2017/0364701 A1* | 12/2017 | Struttmann | ............. | G06F 21/78 |

* cited by examiner

*Primary Examiner* — Polina G Peach
(74) *Attorney, Agent, or Firm* — Fincham Downs LLC; Carson C. K. Fincham

(57) ABSTRACT

Systems, methods, and articles of manufacture provide for non-disruptive complex variable calculations in online environments, such as real time or near-real time transaction processing utilizing non-disruptive variable calculation logic and decision table array inputs.

15 Claims, 9 Drawing Sheets

SYSTEMS AND METHODS FOR NON-DISRUPTIVE COMPLEX VARIABLE CALCULATION IN ONLINE ENVIRONMENTS

BACKGROUND

Many industries leverage large amounts of data in online data processing environments that permit many complex decisions and data management operations to be implemented in connection with practical applications relevant to the specific industry. The complexity of the rules and/or algorithms that direct certain industry actions, however, often requires consumption of vast amounts of computer resources and in many cases may cause or suggest actions that are disruptive to the goals of the industry.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
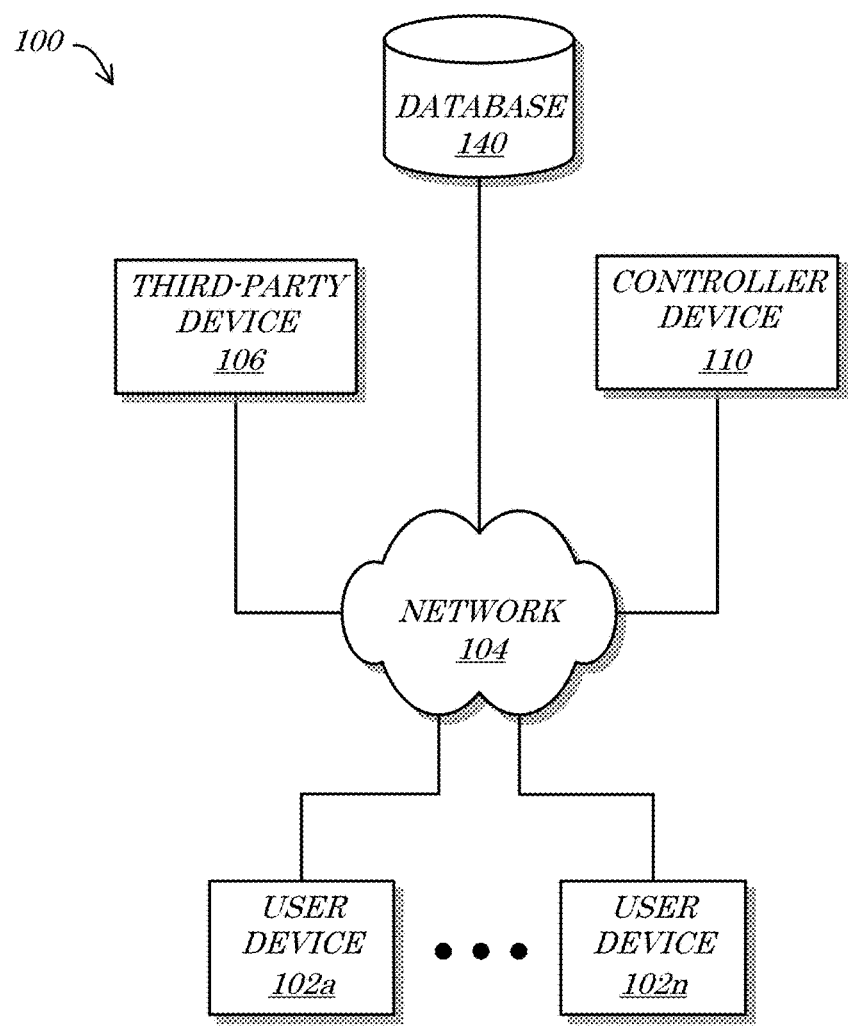
FIG. 1 is a block diagram of a system according to some embodiments.

The widespread availability and adoption of online environments has enabled many industries to accomplish tasks not possible in off-line environments. It is now typical, for example, for complex calculations to be conducted in real-time (or near real-time), such as during online transactions (or otherwise during a sufficiently short time-span, e.g., five (5) to ten (10) seconds, to maintain a consumer's or customer's attention). Complex calculations utilized for various purposes often process input received via online communications to define one or more output variable values. The algorithms and/or logic necessary to perform these complex calculations often require much time and money to develop (e.g., mathematical modeling and/or architecture design, as well as appropriate coding, testing, and maintenance) and are accordingly quite valuable to the industries and specific business for which they are employed.

The complexity of these algorithms, however, typically necessitates a lengthy roll-out period for updates or corrections, particularly in industries that are heavily regulated (e.g., insurance, gambling, financial investments) and must accordingly involve additional procedures (such as regulatory approvals) prior to implementation of new code.

Due to the substantial investment of resources in developing complex calculation code (e.g., programs, modules, and/or applications) as well as the difficulties (e.g., time, cost, possibility of bugs or other errors) in making changes to the code, any given version of the code is often maintained in the production environment of an industry/business for as long as is commercially feasible. The lengthy lifespan of a version of code may cause or perpetuate various problems. Examples of such problems may include, but are not limited to (i) inefficiencies and/or lost opportunities due to antiquated or outdated complex calculation algorithms and (ii) disruptive complex calculation outputs.

In accordance with embodiments herein, these and other deficiencies of previous efforts are remedied, such as by providing systems, apparatus, methods, and articles of manufacture for non-disruptive complex variable calculation, e.g., in online environments. In some embodiments for example, non-disruptive complex variable calculation may comprise: (i) receiving (e.g., by a data transceiver device and/or from a remote user device via a first electronic network pathway) information defining a value for a versioning input variable; (ii) routing (e.g., by the data transceiver device and/or to a computational server cluster) the information defining the value for the versioning input variable; (iii) comparing (e.g., by the computational server cluster) the information defining the value for the versioning input variable with data stored in a computational logic data storage device that correlates the plurality of versioning input variable values and different logical pathways; (iv) identifying (e.g., by the computational server cluster and/or based on the comparing) a first one of the different logical pathways that correlates to the information defining the value for the versioning input variable; (v) identifying (e.g., by the computational server cluster and/or by querying the historic data aggregation device in accordance with logic defined by the first one of the different logical pathways) a historic value for the complex variable; (vi) identifying (e.g., by the computational server cluster and/or by querying the historic data aggregation device in accordance with logic defined by the first one of the different logical pathways) (1) a historic value for each one of the plurality of variables (e.g., the historic value comprising a value for the respective one of the plurality of variables for a historic time period) and (2) a current value for each one of the plurality of variables (e.g., the current value comprising a value for the respective one of the plurality of variables for a current time period that is different than the historic time period); (vii) computing (e.g., by the computational server cluster and/or by respectively querying each one of the plurality of data tables of the memory array utilizing, respectively, each of the current and historic values for the respective one of the plurality of variables, and in accordance with logic defined by the first one of the different logical pathways) a variable adjustment factor for the complex variable; (viii) computing (e.g., by the computational server cluster and/or by executing the at least one programmatic logic routine defining how the value of the complex variable is computed in accordance with the first one of the different logical pathways, wherein the first one of the different logical pathways defines a formula that modifies the historic value for the complex variable based upon each of the computed variable adjustment factors) a current value for the complex variable; (ix) transmitting (e.g., by the computational server cluster and to the data transceiver device) a signal indicative of the computed current value for the complex variable; and (x) providing (e.g., by the data transceiver device and/or to the remote user device via the first electronic network pathway) the data indicative of the computed current value for the complex variable.

These, and other features of embodiments described herein, may provide for decreased complex calculation setup and/or revision costs, quicker implementation, less maintenance, and a higher level of flexibility and ease of variation than previous techniques. Embodiments may also or alternatively reduce transaction delays for certain types of transactions by allowing different classes of transactions to be separately processed (e.g., proceed down a different logical pathway). This may be particularly advantageous, for example, in the case that a certain type of transaction (such as an insurance industry product renewal) is mandated by regulation to incorporate a certain amount of delay (e.g., certain states require that renewal business in the insurance industry be within a certain number of days with respect to a new effective date of a policy renewal), while other types of transactions do not require regulatory delay (or other complexity that may cause delay).

In some embodiments, for example, three (3) primary differences from previous complex calculation techniques may be introduced. First, instead of re-applying or utilizing the base complex calculation formula/logic for each transaction and/or instance, a modified version of the complex calculation is applied to select transactions and/or instances (e.g., effectively splitting "new" and "renewal" business down different logical pathways, which may allow "new" business to be written in a more timely manner than when coupled to the same logical pathway as "renewal" business). Second, the modified version of the complex calculation produces output variables based on previous base calculation results as well as changes in one or more variables typically utilized in the base calculation (e.g., to effectuate a complex variable value, such as a renewal insurance premium, that is non-disruptive). Third, the modified complex calculation may be implemented by leveraging data stored in a plurality of decision tables, e.g., as opposed to relying on hard-coded logic (e.g., allowing for more flexibility in rollout of logic changes).

In such a manner, for example, the output (which may often direct and/or define action in the industry) may be tempered by previous transactions and/or instances to minimize industry disruptions, and may be accomplished in a manner that provides a higher level of flexibility (e.g., modularity) and reduced maintenance and/or regulatory complexity.

II. Complex Variable Calculation Terms and Definitions

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "non-disruptive" value. As utilized herein, the term "non-disruptive" may generally refer to and/or be descriptive of a variable value (such as a value of an output variable from a calculation or procedure) that deviates from a previous value of the same variable by less than a certain threshold amount. Similarly, a "disruptive" variable value may generally refer to and/or be descriptive of a variable value (such as a value of an output variable from a calculation or procedure) that deviates from a previous value of the same variable by more than a certain threshold amount. While the threshold may vary for different industry applications as is or becomes desired and/or practicable, in some cases an exemplary threshold may be ten percent (10%), such that new variable values that differ by ten percent (10%) or less from a previous value may be considered non-disruptive for a particular industry application.

Some embodiments described herein are associated with an "online environment". As utilized herein, the term "online environment" may generally refer to and/or be descriptive of a computing environment and/or system architecture in which one or more input variable values are acquired through and/or via an online interface and/or in which one or more output variable values are provided through and/or via the online interface. According to some embodiments, the interface via which input and/or output is managed in an online environment may comprise a Graphical User Interface (GUI) generated by an interface engine and output via a mobile electronic device such as an electronic tablet or smart phone device.

Some embodiments described herein are associated with "real time" and/or "near-real time" events or occurrences. As utilized herein, the term "real time" may generally refer to and/or be descriptive of an occurrence of an event or activity at a time that is significantly proximate to a previous and/or triggering event or occurrence. In the context of online environment transactions and/or calculations, for example, a real-time occurrence of a calculation may be considered to occur in "real time" with respect to a receiving of an input required for the calculation in the case that the calculation occurs within ten (10) seconds of the receiving of the input. In some embodiments, "real-time" may refer to an occurrence that is effectuate and/or produces results in one (1) minute or less. "Near-real time" may generally refer to and/or be descriptive of an occurrence of an event or activity at a time that is proximate to a previous and/or triggering event or occurrence. Real time events or occurrences are generally more proximate to a previous event than "near-real time" events or occurrences. With reference to the non-limiting examples presented above, for example, while real time may equate to less than one (1) minute or less than ten (10) seconds, a corresponding "near-real time" event may occur greater than one (1) minute but less than three (3) minutes or greater than ten (10) seconds but less than thirty (30) seconds, respectively.

III. Complex Variable Calculation Systems

Referring first to FIG. 1, a block diagram of a system 100 according to some embodiments is shown. In some embodiments, the system 100 may comprise a plurality of user devices 102a-n, a network 104, a third-party device 106, a controller device 110, and/or a database 140. As depicted in FIG. 1, any or all of the devices 102a-n, 106, 110, 140 (or any combinations thereof) may be in communication via the network 104. In some embodiments, the system 100 may be utilized to receive entity data (such as, but not limited to, entity address, entity geographic coordinates, and/or entity characteristic data, e.g., for a business entity, gross sales, employment data, loss data, etc.), and/or other data or metrics relevant to the particular industry. The controller device 110 may, for example, interface with one or more of the user devices 102a-n and/or the third-party device 106 to receive entity data and process such data in accordance with one or more complex variable calculation data processing algorithms or models. In the non-limiting exemplary case of risk and/or insurance analysis, for example, entity data may be analyzed in accordance with a complex variable calculation data processing model that (i) is selectively applied to certain entities, transactions, and/or instances, (ii) is based on previous complex variable calculation results to reduce disruptive output occurrences, and/or (iii) leverages decision tables to enhance modularity as well as to better account for erratic variable value distributions.

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portion thereof) may comprise a risk assessment and/or underwriting or sales program, system, and/or platform programmed and/or otherwise configured to execute, conduct, and/or facilitate any of the methods 300, 400 of FIG. 3 and/or FIG. 4 herein, and/or portions or combinations thereof.

The user devices 102a-n, in some embodiments, may comprise any types or configurations of computing, mobile electronic, network, user, and/or communication devices that are or become known or practicable. The user devices 102a-n may, for example, comprise one or more Personal Computer (PC) devices, computer workstations (e.g., an underwriter workstation), tablet computers such as an iPad® manufactured by Apple®, Inc. of Cupertino, Calif., and/or cellular and/or wireless telephones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102a-n may comprise devices owned and/or operated by one or more users such as claim handlers, field agents, underwriters, account managers, agents/brokers, customer service representatives, data acquisition partners and/or consultants or service providers, and/or underwriting product customers (or potential customers, e.g., consumers). According to some embodiments, the user devices 102a-n may communicate with the controller device 110 via the network 104, such as to conduct underwriting inquiries and/or processes utilizing non-disruptive complex variable calculation apparatus, systems, articles of manufacture, and/or processes as described herein.

In some embodiments, the user devices 102a-n may interface with the controller device 110 to effectuate communications (direct or indirect) with one or more other user devices 102a-n (such communication not explicitly shown in FIG. 1), such as may be operated by other users. In some embodiments, the user devices 102a-n may interface with the controller device 110 to effectuate communications (direct or indirect) with the third-party device 106 (such communication also not explicitly shown in FIG. 1). In some embodiments, the user devices 102a-n and/or the third-party device 106 may comprise one or more sensors configured and/or coupled to sense, measure, calculate, and/or otherwise process or determine industry data, such as, in the example of the insurance industry, policy, geo-spatial, business classification, weather and/or other risk data, and/or claim data. In some embodiments, such sensor data may be provided to the controller device 110, such as to determine which complex variable calculation should be performed, conduct claim handling, pricing, risk assessment, line and/or limit setting, quoting, and/or selling or re-selling of an underwriting product (e.g., utilizing non-disruptive complex variable calculations as described herein).

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102a-n, the third-party device 106, and/or the database 140. In some embodiments, the network 104 may comprise direct communications links between any or all of the components 102a-n, 106, 110, 140 of the system 100. The user devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the user devices 102a-n and the controller device 110, for example, and/or may comprise the Internet, with communication links between the controller device 110 and the third-party device 106 and/or the database 140, for example.

The third-party device 106, in some embodiments, may comprise any type or configuration of a computerized processing device such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102a-n or the controller device 110). The third-party device 106 may, for example, be owned and/or operated by data and/or data service provider such as Dun & Bradstreet® Credibility Corporation (and/or a subsidiary thereof, such as Hoovers™), Deloitte® Development, LLC, Experian™ Information Solutions, Inc., and/or Edmunds.com®, Inc. In some embodiments, the third-party device 106 may supply and/or provide data such as policy information (e.g., governing state data), business and/or other classification data to the controller device 110 and/or the user devices 102a-n. In some embodiments, the third-party device 106 may comprise a plurality of devices and/or may be associated with a plurality of third-party entities.

In some embodiments, the controller device 110 may comprise an electronic and/or computerized controller device such as a computer server communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, Tex. which may include one or more Eight-Core Intel® Xeon® 7500 Series electronic processing devices. In some embodiments, the controller device 110 may comprise a plurality of processing devices specially-programmed to execute and/or conduct processes that are not practicable without the aid of the controller device 110. The controller device 110 may, for example, conduct non-disruptive complex variable calculations in real time or near-real time, as described herein, such calculations not being capable of being timely conducted without the benefit of the specially-programmed controller 110. According to some embodiments, the controller device 110 may be located remote from one or more of the user devices 102a-n and/or the third-party device 106. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more programs that facilitate the provision of non-disruptive complex variable calculations, e.g., in an online environment, as utilized in various industry data processing applications, such as, but not limited to, insurance and/or risk analysis, and/or handling, processing, pricing, underwriting, and/or issuance of one or more insurance and/or underwriting products and/or claims with respect thereto. According to some embodiments, the controller device 110 may comprise a computerized processing device such as a PC, laptop computer, computer server, and/or other electronic device to manage and/or facilitate transactions and/or communications regarding the user devices 102a-n. An insurance company employee, agent, claim handler, underwriter, and/or other user (e.g., customer, consumer, client, or company) may, for example, utilize the controller device 110 to (i) price and/or underwrite one or more products, such as insurance, indemnity, and/or surety products (e.g., based on non-disruptive complex variable calculations) and/or (ii) provide an interface via which a data processing and/or underwriting entity may manage and/or facilitate complex variable calculation data processing, such as the underwriting of various products (e.g., in a selective, modular, and/or non-disruptive manner, in accordance with embodiments described herein).

In some embodiments, the controller device 110 and/or the third-party device 106 (and/or the user devices 102a-n) may be in communication with the database 140. The database 140 may store, for example, policy data, business classification data, location data obtained from the user devices 102a-n, business classification/reclassification and/or policy data defined by the controller device 110, stored data defining previous values for one or more complex variables, and/or instructions that cause various devices (e.g., the controller device 110 and/or the user devices 102a-n) to operate in accordance with embodiments described herein. The database 140 may store, for example, a steering or control/routing table as described herein, and/or one or more decision tables storing variable adjustment factors (e.g., the example data tables 544a-e of FIG. 5 herein). In some embodiments, the database 140 may comprise any type, configuration, and/or quantity of data storage devices that are or become known or practicable. The database 140 may, for example, comprise an array of optical and/or solid-state hard drives configured to store policy and/or location data provided by (and/or requested by) the user devices 102a-n, business classification data, business reclassification data, complex variable value data, and/or process routing and/or versioning data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102a-n or third-party device 106 may comprise the database 140 or a portion thereof, for example, and/or the controller device 110 may comprise the database or a portion thereof.

Figure 2:
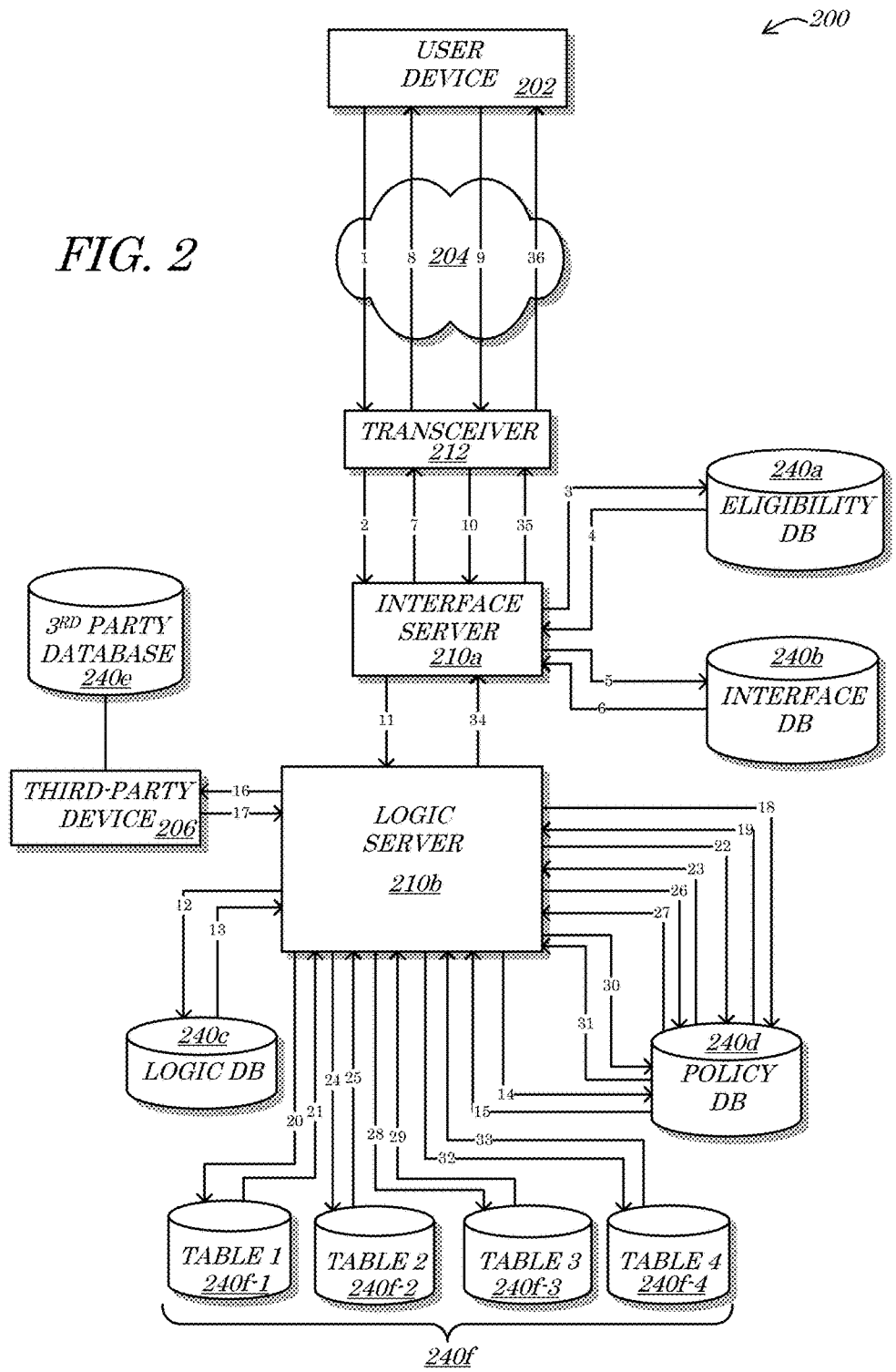
FIG. 2 is a block diagram of a system according to some embodiments.

Referring now to FIG. 2, a block diagram of a system 200 according to some embodiments is shown. In some embodiments, the system 200 may comprise a user device 202, a network 204, a third-party device 206, an interface server 210a (e.g., a web server), a logic server 210b, a transceiver 212, and/or a plurality of databases 240 (e.g., a first or eligibility database 240a, a second or interface database 240b, a third or logic database 240c, a fourth or policy database 240d, a fifth or a third-party database 240e, and/or an array of decision tables 240f). In some embodiments, any or all of the devices 202, 206, 210a-b, 212, 240a-f (or any combinations thereof) may be in communication via the network 204. In some embodiments, the system 200 may define and/or reside in an online environment, such as in the case that the network 204 comprises the Internet (or, more practically, a portion thereof).

Fewer or more components 202, 204, 206, 210a-b, 212, 240a-f and/or various configurations of the depicted components 202, 204, 206, 210a-b, 212, 240a-f may be included in the system 200 without deviating from the scope of embodiments described herein. In some embodiments, the components 202, 204, 206, 210a-b, 212, 240a-f may be similar in configuration and/or functionality to similarly named and/or numbered components as described herein. In some embodiments, the system 200 (and/or portion thereof) may comprise a risk assessment and/or underwriting or sales program, system, and/or platform programmed and/or otherwise configured to execute, conduct, and/or facilitate any of the methods 300, 400 of FIG. 3 and/or FIG. 4 herein, and/or portions or combinations thereof.

According to some embodiments, for example, the system 200 may process online environment data inputs utilized to conduct complex variable calculations (e.g., non-disruptive calculations). The user device 202 may, for example, transmit and/or provide, via the network 204, a first input variable (and/or value thereof). In some embodiments, such as depicted by a first electronic communications and/or network pathway "1" in FIG. 2, the first input variable (and/or value thereof) may be provided, transmitted, broadcast, routed, and/or received or retrieved by the transceiver 212 (which may be remote from the user device 202). In some embodiments, the first input variable (and/or value thereof) may comprise and/or define an eligibility input variable (and/or value thereof) that may, for example, direct the system 200 to apply a particular rules, logic, and/or interface version from a plurality of available versions. In some embodiments, the transceiver 212 may forward and/or route the first input variable (e.g., data descriptive and/or indicative of the variable and/or the value thereof) to the interface server 210a (e.g., via a second electronic communications and/or network pathway "2"). According to some embodiments, the interface server 210a (e.g., an interface generation device) may utilize the first input variable (and/or value thereof) to structure and/or initiate a first query to the eligibility database 240*a* (e.g., via a third electronic communications and/or network pathway "3").

The eligibility database 240*a* may store, for example, data relating various possible first input variables and/or possible values of the first input variable to one or more of a plurality of groups, categories, classes, tiers, and/or other classification objects or logical "buckets" (any or all of which are referred to herein as simply "categories" or "eligibility categories", for convenience). According to some embodiments, the eligibility categories may be stored in relation to one or more interface component and/or version identifiers. In some embodiments, in response to the query and/or utilizing the first input variable (and/or value thereof), the eligibility database 240*a* (and/or a processing device associated therewith) may identify, select, locate, and/or otherwise determine or assign a first subset of eligibility categories (e.g., from a plurality of available eligibility categories) and/or a subset of interface versions and/or component identifiers. In some embodiments, the first subset of eligibility categories (and/or indications thereof) and/or the subset of interface version and/or component identifiers may be transmitted and/or provided, by the eligibility database 240*a*, to the interface server 210*a*, such as in response to the initiation of the first query (e.g., via a fourth electronic communications and/or network pathway "4").

In some embodiments, the interface server 210*a* may utilize the first subset of eligibility categories (and/or value(s) thereof) and/or the subset of interface version and/or component identifiers to structure and/or initiate a second query to the interface database 240*b* (e.g., via a third electronic communications and/or network pathway "5"). The interface database 240*b* may store, for example, data defining and/or indicative of a plurality of available interfaces, interface versions, and/or interface components (e.g., data structured and/or coded in one or more markup languages, such as in accordance with the HTML5 markup language as defined by "A vocabulary and associated APIs for HTML and XHTML" published by the World Wide Web Consortium (W3C) on Oct. 28, 2014) and/or may relate such components to one or more identifiers thereof. In some embodiments, in response to the query and/or utilizing the first subset of eligibility categories (and/or value(s) thereof) and/or the subset of interface version and/or component identifiers, the interface database 240*b* (and/or a processing device associated therewith) may identify, locate, and/or otherwise determine a first subset of interface components (e.g., from a plurality of available interface components). Identifiers received from the first query to the eligibility database 240*a* may, for example, be compared and/or matched to identifiers stored in the interface database 240*b* in relation to various available interface components (e.g., XML, HTML, and/or other code or objects). In some embodiments, the first subset of interface components (and/or indications thereof) may be transmitted and/or provided, by the interface database 240*b*, to the interface server 210*a*, such as in response to the initiation of the second query (e.g., via a sixth electronic communications and/or network pathway "6").

According to some embodiments, the interface server 210*a* may utilize the first subset of interface components (and/or indications thereof) to generate (or cause a generation of) one or more interfaces and/or components (not shown in FIG. 2). The interface server 210*a* may, for example, transmit data defining the first subset of the plurality of interface components to the transceiver 212 (e.g., via a seventh electronic communications and/or network pathway "7"), which may in turn route and/or transmit (address-based or broadcast transmission) the data defining the first subset of the plurality of interface components, via the network 204, to the user device 202 (e.g., via an eighth electronic communications and/or network pathway "8"). The transmission of the data defining the first subset of the plurality of interface components to the user device 202 (e.g., in response to the transmitting and/or providing of the first input variable by the user device 202) may cause the user device 202 to output a first interface (not shown). While the first interface generated based on, defined by, and/or comprising the first subset of the plurality of interface components is referenced as "first", for convenience, it should be understood that other interfaces may be provided prior to and/or after the "first" interface. The first input variable may, for example, be received and/or input via an interface provided by, to, and/or via the user device 202 prior to the generation of the "first" interface based on the first subset of the plurality of interface components.

In some embodiments, the generation of the first interface may cause a presentation, to a user of the user device 202, of a first interactive input mechanism which prompts the user to enter a value of a versioning input variable. According to some embodiments, the user may utilize the first interactive input mechanism and/or respond to the prompt by entering and/or defining the value of the versioning input variable. In some embodiments, the provision of input via the first interactive input mechanism may cause the user device 202 to transmit and/or provide the value of the versioning input variable (and/or an indication thereof) to the transceiver 212 (e.g., via a ninth electronic communications and/or network pathway "9"). In some embodiments, the transceiver 212 may receive the value of the versioning input variable and transmit, provide, and/or route the value of the versioning input variable to (or through or via) the interface server 210*a* (e.g., via a tenth electronic communications and/or network pathway "10").

According to some embodiments, the interface server 210*a* may transmit and/or provide the value of the versioning input variable to the logic server 201*b* (e.g., via an eleventh electronic communications and/or network pathway "11"). The logic server 210*b* may, in some embodiments, comprise a computational server cluster programmed to accept the versioning input variable as input into an industry-specific logical and/or programmatic analysis routine. In some embodiments, the logic server 210*b* may be communicatively coupled to a second electronic network pathway, e.g., different than the first electronic network pathway. According to some embodiments for example, the logic server 210*b* may execute stored instructions that cause the logic server 210*b* to compare the information defining the value for the versioning input variable with data stored in the logic database 240*c*. The logic database 240*c* may, for example, comprise a computational logic data storage device that correlates a plurality of possible versioning input variable values to one or more different logical pathways (e.g., logic and/or computational versions). According to some embodiments, the logic database 240*c* may be in communication with the logic server 210*b* and may store (i) data correlating a plurality of versioning input variable values and different logical pathways and (ii) at least one programmatic logic routine defining how the value of the complex variable is computed in accordance with one or more of the different logical pathways, wherein execution of the at least one programmatic logic routine by the logic server 210*b*, results in execution of one or more of the processes and/or methods 300, 400 of FIG. 3 and/or FIG. 4 herein, and/or portions or combinations thereof.

In some embodiments, the logic server 210b may utilize the value of the versioning input variable to structure and/or initiate a third query to the logic database 240c (e.g., via a twelfth electronic communications and/or network pathway "12"). The logic database 240c may store, for example, data defining and/or indicative of a plurality of programmatic, coded, and/or logical routines, applications, modules, pathways, instructions, and/or versions (any or all of which are referred to herein as simply "coded logical pathways", for convenience) and/or may relate such coded logical pathways to one or more possible values of the versioning input variable. In some embodiments, in response to the query and/or utilizing the value of the versioning input variable, the logic database 240c (and/or a processing device associated therewith) may identify, locate, and/or otherwise determine a first subset of the coded logical pathways (e.g., from a plurality of available coded logical pathways). The value of the versioning input variable received from the user device 202 may, for example, be compared and/or matched to values stored in the logic database 240c in relation to various coded logical pathways. In some embodiments, the first subset of the coded logical pathways (and/or indications thereof) may be transmitted and/or provided, by the logic database 240c, to the logic server 210b, such as in response to the initiation of the third query (e.g., via a thirteenth electronic communications and/or network pathway "13").

According to some embodiments, the logic server 210b may utilize the first subset of the coded logical pathways (and/or indications or value(s) thereof) to structure and/or initiate a fourth query to the policy database 240d (e.g., via a fourteenth electronic communications and/or network pathway "14"). The policy database 240d may store, for example, industry-specific customer or client policy information and/or historic (e.g., previously calculated and/or calculated with respect to a time period that has closed prior to the receiving of the value of the versioning input variable from the user device 202) data defining previous values for a complex variable and/or may relate such historic complex variable value(s) to one or more of (i) the user device 202 (e.g., an identifier and/or location thereof), (ii) an identifier of the user of the user device 202 (e.g., an account identifier, address (e.g., location), business name, etc.), (iii) the first input variable (and/or value thereof), (iv) the value of the versioning input variable, and/or (v) the first subset of the coded logical pathways. The policy database 240d may, for example, comprise a historic data aggregation device storing data defining values for each of a plurality of variables in correlation with specific historic time periods.

In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, and/or (v) the first subset of the coded logical pathways, the policy database 240d (and/or a processing device associated therewith) may identify, locate, and/or otherwise determine a historic value for the complex variable (e.g., from a plurality of stored historic values for the complex variable). An identifier of the user device 202 and/or user thereof, such as an account or policy identifier may, for example, be compared and/or matched to values stored in the policy database 240d in relation to historic values for the complex variable. In some embodiments, the identified historic value for the complex variable (and/or an indication thereof) may be transmitted and/or provided, by the policy database 240d, to the logic server 210b, such as in response to the initiation of the fourth query (e.g., via a fifteenth electronic communications and/or network pathway "15").

According to some embodiments, the logic server 210b (e.g., in accordance with the first subset of the coded logical pathways) may utilize information retrieved from the user device 202 and/or the policy database 240d to conduct pre-processing activities, such as by computing one or more dependent variables needed for computation of an updated or new value for the complex variable. The logic server 210b may, in the context of an insurance industry application for example, utilize existing policy information retrieved from the policy database 240d and/or business (or personal) information received from the user device 202 to calculate a size parameter for the existing or desired account or product. In some embodiments, the size parameter may comprise a qualitative descriptor such as "small", "medium", or "large", each of which may correspond to particular value ranges for a certain variable, such as business annual gross receipts.

In some embodiments, the logic server 210b may utilize the first subset of the coded logical pathways (and/or indications or value(s) thereof) to structure and/or initiate a fifth query to the third-party device 206 and/or the third-party database 240e (e.g., via a sixteenth electronic communications and/or network pathway "16"). The third party device 206 may be in communication with and/or store the third-party database 240e, for example, and may control access to the third-party database 240e and/or may otherwise manage access thereto. In some embodiments, the third-party device 206 may comprise an informational access server of a third-party data provider and the third-party database 240e may store paid-access third-party data. The third-party database 240e may store, for example, general or industry-specific customer or client data (e.g., gathered externally from the system 200), such as values for risk metrics calculated with respect to a particular business, customer, or other entity.

In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, (v) the first subset of the coded logical pathways, and/or (vi) policy information retrieved from the user device 202 and/or the policy database 240d, the third-party device 206 and/or the third-party database 240e may identify, locate, calculate, and/or otherwise determine a current value for a risk variable. An identifier of the user device 202 and/or user thereof, such as business name or identifier may, for example, be compared and/or matched to values stored in the third-party database 240e in relation to values for the risk variable and/or instructions may be executed to compute the value of the risk variable that corresponds to the information provided in the fifth query. In some embodiments, the identified and/or calculated risk variable value (and/or an indication thereof) may be transmitted and/or provided, by the third-party device 206 and/or the third-party database 240e, to the logic server 210b, such as in response to the initiation of the fifth query (e.g., via a seventeenth electronic communications and/or network pathway "17"). In some embodiments, the risk variable may comprise a first one of a plurality of variables required to compute a value for the complex variable.

According to some embodiments, the logic server 210b may utilize the first subset of the coded logical pathways (and/or indications or value(s) thereof) to structure and/or initiate a sixth query to the policy database 240d (e.g., via an eighteenth electronic communications and/or network pathway "18"). In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, (v) the first subset of the coded logical pathways, and/or (vi) policy information retrieved from the user device 202, the policy database 240d (and/or a processing device associated therewith) may identify, locate, calculate, and/or otherwise determine a historic value (e.g., previously calculated and/or calculated with respect to a time period that has closed prior to the receiving of the value of the versioning input variable from the user device 202) for the risk variable. An identifier of the user device 202 and/or user thereof, such as an account identifier, for example, may be compared and/or matched to values stored in the policy database 240d in relation to previous values for the risk variable and/or instructions may be executed to compute the historic value of the risk variable that corresponds to the information provided in the sixth query (e.g., a historic time-period over which the historic values of the risk variable should be summed or otherwise mathematically analyzed). In some embodiments, the identified and/or calculated historic value for the risk variable (and/or an indication thereof) may be transmitted and/or provided, by the policy database 240d, to the logic server 210b, such as in response to the initiation of the sixth query (e.g., via a nineteenth electronic communications and/or network pathway "19").

In some embodiments, the logic server 210b (e.g., in accordance with the first subset of the coded logical pathways) may utilize each of the current and historic values for the risk variable to compute a first adjustment factor for the complex variable. The logic server 210b may, for example, utilize the first subset of the coded logical pathways (and/or indications or value(s) thereof) to structure and/or initiate a seventh query to a first one of the plurality of data tables 240f-1 of the memory array 240f (e.g., via a twentieth electronic communications and/or network pathway "20"). The memory array 240f may, for example, comprise a plurality of data tables (240f-1, 240f-2, 240f-3, 240f-4), each data table storing data defining a relationship between a specific value for one of the plurality of variables and a corresponding variable adjustment factor. In some embodiments, in response to the query and/or utilizing each of the current and historic values for the risk variable, the first one of the plurality of data tables 240f-1 (and/or a processing device associated therewith) may identify, locate, calculate, and/or otherwise determine the first adjustment factor for the complex variable. According to some embodiments, the first one of the plurality of data tables 240f-1 may store an array of values for the first adjustment factor for the complex variable, each value in the array being associated with a possible combination of values for (or values calculated from) the combination of the current and historic values for the risk variable. In such a manner, for example, the first subset of the coded logical pathways need not be updated or edited to account for changes in the relationship between the values of the risk variable and the first adjustment factor, which permits an expedited rollout of computational changes compared to utilization of hard-coded logic calculation routines. In some embodiments, the identified and/or calculated value for the first adjustment factor for the complex variable (and/or an indication thereof) may be transmitted and/or provided, by the first one of the plurality of data tables 240f-1, to the logic server 210b, such as in response to the initiation of the seventh query (e.g., via a twenty-first electronic communications and/or network pathway "21").

According to some embodiments, the logic server 210b may utilize the first subset of the coded logical pathways (and/or indications or value(s) thereof) to structure and/or initiate an eighth and/or ninth query to the policy database 240d (e.g., via a twenty-second electronic communications and/or network pathway "22"). In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, (v) the first subset of the coded logical pathways, and/or (vi) policy information retrieved from the user device 202, the policy database 240d (and/or a processing device associated therewith) may identify, locate, calculate, and/or otherwise determine current (e.g., calculated with respect to a first time period) and/or historic (e.g., previously calculated and/or calculated with respect to a second time period that has, e.g., closed prior to the receiving of the value of the versioning input variable from the user device 202, or is different than the first time period) values for a loss variable. An identifier of the user device 202 and/or user thereof, such as an account identifier for example, may be compared and/or matched to values stored in the policy database 240d in relation to current and/or historic values for the loss variable and/or instructions may be executed to compute the current and/or historic value of the loss variable that corresponds to the information provided in the eighth and/or ninth query (e.g., a historic time-period over which the historic values of the loss variable should be summed or otherwise mathematically analyzed and/or a formula by which a current value representative of loss should be calculated). In some embodiments, the identified and/or calculated current and/or historic values for the loss variable (and/or an indication thereof) may be transmitted and/or provided, by the policy database 240d, to the logic server 210b, such as in response to the initiation of the eighth and/or ninth query (e.g., via a twenty-third electronic communications and/or network pathway "23"). In some embodiments, the loss variable may comprise a second one of the plurality of variables required to compute a value for the complex variable.

In some embodiments, the logic server 210b (e.g., in accordance with the first subset of the coded logical pathways) may utilize each of the current and historic values for the loss variable to compute a second adjustment factor for the complex variable. The logic server 210b may, for example, utilize the first subset of the coded logical pathways (and/or indications or value(s) thereof) to structure and/or initiate a tenth query to a second one of the plurality of data tables 240f-2 of the memory array 240f (e.g., via a twenty-fourth electronic communications and/or network pathway "24"). In some embodiments, in response to the query and/or utilizing each of the current and historic values for the loss variable, the second one of the plurality of data tables 240f-2 (and/or a processing device associated therewith) may identify, locate, calculate, and/or otherwise determine the second adjustment factor for the complex variable. According to some embodiments, the second one of the plurality of data tables 240f-2 may store an array of values for the second adjustment factor for the complex variable, each value in the array being associated with a possible combination of values for (or values calculated from) the combination of the current and historic values for the loss variable. In such a manner, for example, the first subset of the coded logical pathways need not be updated or edited to account for changes in the relationship between the values of the loss variable and the second adjustment factor, which permits an expedited rollout of computational changes compared to utilization of hard-coded logic calculation routines. In some embodiments, the identified and/or calculated value for the second adjustment factor for the complex variable (and/or an indication thereof) may be transmitted and/or provided, by the second one of the plurality of data tables 240*f*-2, to the logic server 210*b*, such as in response to the initiation of the tenth query (e.g., via a twenty-fifth electronic communications and/or network pathway "25").

According to some embodiments, the logic server 210*b* may utilize the first subset of the coded logical pathways (and/or indications or value(s) thereof) to structure and/or initiate an eleventh and/or twelfth query to the policy database 240*d* (e.g., via a twenty-sixth electronic communications and/or network pathway "26"). In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, (v) the first subset of the coded logical pathways, and/or (vi) policy information retrieved from the user device 202, the policy database 240*d* (and/or a processing device associated therewith) may identify, locate, calculate, and/or otherwise determine current (e.g., calculated with respect to a first time period) and/or historic (e.g., previously calculated and/or calculated with respect to a second time period that has, e.g., closed prior to the receiving of the value of the versioning input variable from the user device 202, or is different than the first time period) values for a billing experience variable. An identifier of the user device 202 and/or user thereof, such as an account identifier for example, may be compared and/or matched to values stored in the policy database 240*d* in relation to current and/or historic values for the billing experience variable and/or instructions may be executed to compute the current and/or historic value of the billing experience variable that corresponds to the information provided in the eleventh and/or twelfth query (e.g., a historic time-period over which the historic values of the billing experience variable should be summed or otherwise mathematically analyzed and/or a formula by which a current value representative of billing experience should be calculated). In some embodiments, the identified and/or calculated current and/or historic values for the billing experience variable (and/or an indication thereof) may be transmitted and/or provided, by the policy database 240*d*, to the logic server 210*b*, such as in response to the initiation of the eleventh and/or twelfth query (e.g., via a twenty-seventh electronic communications and/or network pathway "27"). In some embodiments, the billing experience variable may comprise a third one of the plurality of variables required to compute a value for the complex variable.

In some embodiments, the logic server 210*b* (e.g., in accordance with the first subset of the coded logical pathways) may utilize each of the current and historic values for the billing experience variable to compute a third adjustment factor for the complex variable. The logic server 210*b* may, for example, utilize the first subset of the coded logical pathways (and/or indications or value(s) thereof) to structure and/or initiate a thirteenth query to a third one of the plurality of data tables 240*f*-3 of the memory array 240*f* (e.g., via a twenty-eighth electronic communications and/or network pathway "28"). In some embodiments, in response to the query and/or utilizing each of the current and historic values for the billing experience variable, the third one of the plurality of data tables 240*f*-3 (and/or a processing device associated therewith) may identify, locate, calculate, and/or otherwise determine the third adjustment factor for the complex variable. According to some embodiments, the third one of the plurality of data tables 240*f*-2 may store an array of values for the third adjustment factor for the complex variable, each value in the array being associated with a possible combination of values for (or values calculated from) the combination of the current and historic values for the billing experience variable. In such a manner, for example, the first subset of the coded logical pathways need not be updated or edited to account for changes in the relationship between the values of the billing experience variable and the third adjustment factor, which permits an expedited rollout of computational changes compared to utilization of hard-coded logic calculation routines. In some embodiments, the identified and/or calculated value for the third adjustment factor for the complex variable (and/or an indication thereof) may be transmitted and/or provided, by the third one of the plurality of data tables 240*f*-3, to the logic server 210*b*, such as in response to the initiation of the thirteenth query (e.g., via a twenty-ninth electronic communications and/or network pathway "29").

According to some embodiments, the logic server 210*b* may utilize the first subset of the coded logical pathways (and/or indications or value(s) thereof) to structure and/or initiate a fourteenth and/or fifteenth query to the policy database 240*d* (e.g., via a thirtieth electronic communications and/or network pathway "30"). In some embodiments, in response to the query and/or utilizing any of (i) an identifier or location of the user device 202, (ii) an identifier or location of the user of the user device 202, (iii) the first input variable (and/or value thereof), (iv) the value of the versioning input variable, (v) the first subset of the coded logical pathways, and/or (vi) policy information retrieved from the user device 202, the policy database 240*d* (and/or a processing device associated therewith) may identify, locate, calculate, and/or otherwise determine current (e.g., calculated with respect to a first time period) and/or historic (e.g., previously calculated and/or calculated with respect to a second time period that has, e.g., closed prior to the receiving of the value of the versioning input variable from the user device 202, or is different than the first time period) values for a characteristics variable. An identifier of the user device 202 and/or user thereof, such as an account identifier for example, may be compared and/or matched to values stored in the policy database 240*d* in relation to current and/or historic values for the characteristics variable and/or instructions may be executed to compute the current and/or historic value of the characteristics variable that corresponds to the information provided in the fourteenth and/or fifteenth query (e.g., a historic time-period over which the historic values of the characteristics variable should be summed or otherwise mathematically analyzed and/or a formula by which a current value representative of characteristics should be calculated). In some embodiments, the identified and/or calculated current and/or historic values for the characteristics variable (and/or an indication thereof) may be transmitted and/or provided, by the policy database 240*d*, to the logic server 210*b*, such as in response to the initiation of the fourteenth and/or fifteenth query (e.g., via a thirty-first electronic communications and/or network pathway "31"). In some embodiments, the characteristics variable may comprise a fourth one of the plurality of variables required to compute a value for the complex variable.

In some embodiments, the logic server 210*b* (e.g., in accordance with the first subset of the coded logical pathways) may utilize each of the current and historic values for the characteristics variable to compute a fourth adjustment factor for the complex variable. The logic server 210*b* may, for example, utilize the first subset of the coded logical pathways (and/or indications or value(s) thereof) to structure and/or initiate a sixteenth query to a fourth one of the plurality of data tables 240*f*-4 of the memory array 240*f* (e.g., via a thirty-second electronic communications and/or network pathway "32"). In some embodiments, in response to the query and/or utilizing each of the current and historic values for the characteristics variable, the fourth one of the plurality of data tables 240*f*-4 (and/or a processing device associated therewith) may identify, locate, calculate, and/or otherwise determine the fourth adjustment factor for the complex variable. According to some embodiments, the fourth one of the plurality of data tables 240*f*-2 may store an array of values for the fourth adjustment factor for the complex variable, each value in the array being associated with a possible combination of values for (or values calculated from) the combination of the current and historic values for the characteristics variable. In such a manner, for example, the first subset of the coded logical pathways need not be updated or edited to account for changes in the relationship between the values of the characteristics variable and the fourth adjustment factor, which permits an expedited rollout of computational changes compared to utilization of hard-coded logic calculation routines. In some embodiments, the identified and/or calculated value for the fourth adjustment factor for the complex variable (and/or an indication thereof) may be transmitted and/or provided, by the fourth one of the plurality of data tables 240*f*-4, to the logic server 210*b*, such as in response to the initiation of the sixteenth query (e.g., via a thirty-third electronic communications and/or network pathway "33").

According to some embodiments, each of the adjustment factors may be utilized to compute and/or calculate a new, updated, and/or current value for the complex variable. The logic server 210*b* may, for example, execute at least one programmatic logic routine defining how the value of the complex variable is computed, e.g., in accordance with the first one of the different logical pathways. In some embodiments, the first one of the different logical pathways may define a formula that modifies the historic value for the complex variable (e.g., as retrieved from the policy database 240*d*) based upon each of the first, second, third, and fourth adjustment factors, a current value for the complex variable. The logic server 210*b* may, in some embodiments, execute specially-programmed code descriptive of and/or defining the formula to modify the historic value for the complex variable by applying the adjustment factors, to obtain, achieve, define, and/or compute a new or updated value for the complex variable. In such a manner, for example, the new value of the complex variable may be based on differences (e.g., "deltas") between previous values for any or all dependent variables and current values for the same variables, e.g., as opposed to utilizing the standard base calculation for the complex variable. In cases where application of the standard calculation or equation would result in a significant deviation from the previous value of the complex variable, utilizing the various differential values to adjust the historic value may provide for a non-disruptive calculation output.

In some embodiments, the current value (and/or an indication thereof) for the complex variable (e.g., the non-disruptive value) may be transmitted and/or provided by the logic server 210*b* to the interface server 210*a* (e.g., via a thirty-fourth electronic communications and/or network pathway "34"). In some embodiments, the interface server 210*a* may provide, transmit, forward, and/or route the current value (and/or an indication thereof) for the complex variable to the transceiver 212 (e.g., via a thirty-fifth electronic communications and/or network pathway "35") and/or the transceiver 212 may provide, transmit, forward, and/or route the current value (and/or an indication thereof) for the complex variable to the user device 202 (e.g., via a thirty-sixth electronic communications and/or network pathway "36").

According to some embodiments, any or all of the electronic communications and/or network pathways depicted and/or described with respect to FIG. 2 may comprise any number, type, and/or configuration of pathways and/or associated physical objects that are or become known or practicable. While four (4) different pathways ("1", "8", "9", and "36") are depicted and described as providing communicative functionality between the user device 202 and the transceiver 212, for example, all communications along those four (4) pathways may be effectuated through or via a single object or medium such as a single wire, cable (e.g., coaxial), trace, and/or or connection (e.g., a packet-switched communication session connection, a cellular wireless communications session, etc.). In some embodiments, different communicative transmissions and/or pathways may be effectuated and/or implemented, controlled, and/or managed by different processing devices and/or components. The logic server 210*b* may, for example, utilize and/or employ a first server and/or processing unit or thread to effectuate the twentieth ("20") and twenty-first ("21") pathways while a second server and/or processing unit or thread may effectuate the twenty-fourth ("24") and twenty-fifth ("25") pathways. The consecutive numbering and/or descriptions of the different pathways are utilized for convenience of description only, are not limiting, and are not necessarily indicative of chronological or temporal relationships between the pathways or related functionalities. Particularly in the case that different processing units of the logic server 210*b* effectuate different pathways, for example, such pathways (e.g., the twentieth ("20") and twenty-first ("21") pathways and the twenty-fourth ("24") and twenty-fifth ("25") pathways) may be effectuate simultaneously (e.g., such as in the case that the logic server 210*b* is configured to provide multi-threaded processing).

IV. Complex Variable Calculation Processes

Figure 3:
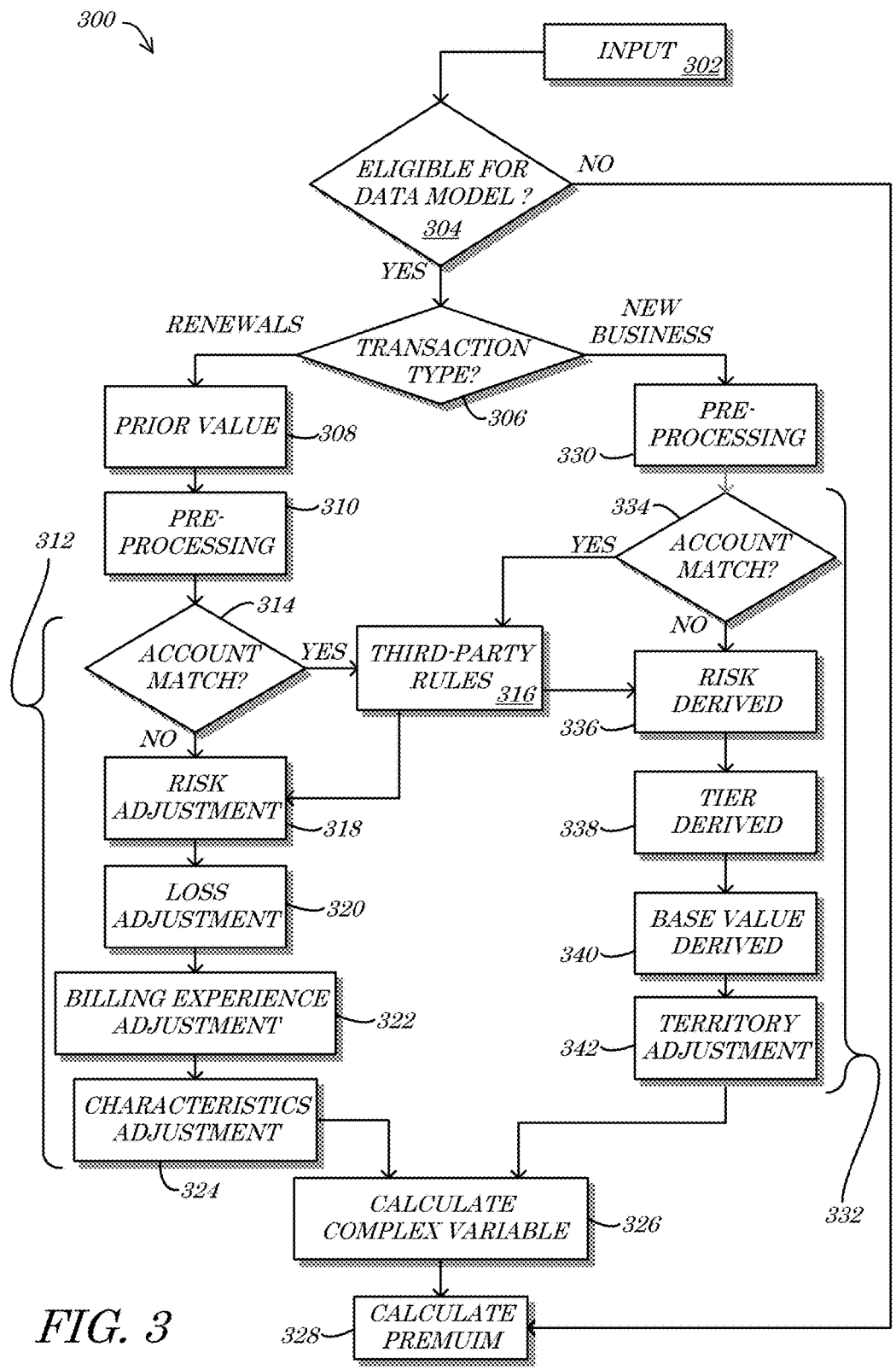
FIG. 3 is a flow diagram of a method according to some embodiments.

Referring now to FIG. 3, a flow diagram of a method 300 according to some embodiments is shown. In some embodiments, the method 300 may be performed and/or implemented by and/or otherwise associated with one or more specialized and/or specially-programmed computers (e.g., the user devices 102*a-n*, 202, the third-party device 106, 206, the controller/server devices 110, 210*a-b*, and/or the transceiver device 212, of FIG. 1 and/or FIG. 2 herein), specialized computers, computer terminals, computer servers, computer systems and/or networks, and/or any combinations thereof (e.g., by one or more multi-threaded and/or multi-core processing units of an insurance company data processing system). In some embodiments, the method 300 may be embodied in, facilitated by, and/or otherwise associated with various input mechanisms and/or interfaces.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 140, 240a-f, 540, 640, 740a-e of FIG. 1, FIG. 2, FIG. 5, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

According to some embodiments, the method 300 may comprise receiving (and/or otherwise determining; e.g., via an electronic communication and/or network pathway) input, at 302. A transceiver and/or server device disposed remotely from a user device (e.g., a wireless and/or portable electronic device operated by a user) may, for example, receive data from and/or descriptive of the user, such as a policy and/or customer identifier, a business name, an address, an industrial or commercial class code, a business segment, and/or qualitative value information such as Total Insured Value (TIV), gross receipts, etc. In some embodiments, the input may be received via an interface, such as a Graphical User Interface (GUI), generated by an interface server (and/or application) and presented to the user via the user device. In some embodiments, the input may comprise a definition and/or selection of a value for an eligibility input variable and/or may be received via a first electronic network pathway. According to some embodiments, the value for the eligibility input variable (and/or information indicative thereof) may be forwarded and/or routed from the transceiver device to the interface server (e.g., at least one interface generation device) and/or may otherwise be received and/or retrieved by the interface server.

In some embodiments, the method 300 may comprise computing (and/or otherwise determining) whether the input corresponds to an eligibility for data modeling, at 304. The computing and/or determining may comprise, for example, identifying (and/or otherwise determining; e.g., by querying a database) a first subset of a plurality of interface components and/or a first subset of a plurality of eligibility categories that correspond to the input. Data defining and/or identifying the plurality of interface components and/or the plurality of eligibility categories may, for example, be stored in a database accessed by the interface server (and/or a logic server) and the interface server (and/or logic server) may utilize the value for the eligibility input variable (and/or information indicative thereof) to query the database. In some embodiments, the database (e.g., a first database) may store data (and/or store data in a particular manner) that relates individual interface components from the plurality of interface components and/or individual eligibility categories of the plurality of eligibility categories to one or more possible values of the eligibility input variable. According to some embodiments, the database may store eligibility data that relates various eligibility logic variable values (e.g., for groups, classes, qualitative ranges, etc.) to one or more possible values of the eligibility input variable. In some embodiments, the value of the eligibility input variable may be compared to stored values to identify and/or select the first subset of the plurality of interface components (e.g., from the plurality of interface components) and/or the first subset of the plurality of eligibility categories (e.g., from the plurality of eligibility categories).

According to some embodiments, in the case that the identified first subset of the plurality of interface components and/or the first subset of the plurality of eligibility categories correspond to an eligibility for data modeling (e.g., such correspondence being stored in the database), a particular interface version may be provided to the user (e.g., in response to the input). The particular interface version may be generated and/or provided, for example, by (i) retrieving (e.g., by the at least one interface generation device), from a mark-up language memory storage device and utilizing information identifying the first subset of the plurality of interface components, corresponding data defining the first subset of the plurality of interface components, and/or (ii) transmitting (e.g., by the at least one interface generation device and to the data transceiver device) the data defining the first subset of the plurality of interface components. In some embodiments, the generation of the particular interface version may comprise providing (e.g., by the data transceiver device and to the remote user device via the first electronic network pathway) the data defining the first subset of the plurality of interface components.

In some embodiments, the method 300 may comprise computing (and/or otherwise determining) whether the input corresponds to a particular transaction type, at 306. The computing and/or determining may comprise, for example, receiving (e.g., via the particular interface version) a value of a versioning input variable. The implementation of the first subset of the plurality of interface components to generate the graphical user interface on the remote user device may cause a presentation to the user, for example, of a first interactive input mechanism which prompts the user to enter the value for the versioning input variable. In some embodiments, the value of the versioning input variable may be input into the first interactive input mechanism and relayed, routed, transmitted, and/or provided to a transceiver device and/or a server (e.g., via the first electronic network pathway). According to some embodiments, the server may comprise a computational server cluster comprising a plurality of cooperative processing units. In some embodiments, the transceiver may receive the value of the versioning input variable (via the first electronic network pathway) and may route the value (and/or data indicative thereof) to the computational server cluster.

According to some embodiments, the computing may comprise comparing (e.g., by the computational server cluster) the information defining the value for the versioning input variable with data stored in a computational logic data storage device that correlates a plurality of versioning input variable values and different logical pathways (e.g., from a plurality of available logical pathways). In some embodiments, the computing may further comprise identifying (e.g., by the computational server cluster and based on the comparing) a first one of the different logical pathways that correlates to the information defining the value for the versioning input variable. In the ongoing and non-limiting example of a specific industry application with respect to insurance calculations in an online environment, for example, the value of the versioning input variable may indicate whether the input is related to "new business" or "renewal business", and the computational server cluster may identify an appropriate logical pathway for either type of transaction associated with the input. According to some embodiments, the different logical pathways may be mutually exclusive. In the case that processing is directed down a first logical pathway specially-programmed for "renewal business" (e.g., as described in detail herein), for example, various applied rules and/or provided interfaces may be utilized that are not utilized in the case that processing is directed down a second logical pathway specially-programmed for "new business".

In the case that the value for the versioning input variable is indicative of "renewal business" (or a different first value for the versioning input variable) and the processing is directed down the first logical pathway specially-programmed for e.g., "renewal business", the method 300 may proceed to identifying a prior value for a complex variable, at 308. In some embodiments, the identifying may be conducted by the computational server cluster and/or by querying a historic data aggregation device in accordance with logic defined by the first one of the different logical pathways. According to some embodiments, the prior value of the complex variable may comprise a value of the complex variable that was determined at a previous point in time and/or with respect to a previous time period. The prior value may comprise, for example, a historic value that is (or was) calculated with respect to a period in time that has closed, such as prior to receiving the input at 302. In some embodiments, the historic and/or prior value may be representative of a previous annual time period, such as a single previous calendar year (e.g., the calendar year previous to the year during which the input is received at 302).

According to some embodiments, the method 300 may comprise (e.g., in accordance with the first logical pathway) conducting pre-processing, at 310. The computational server cluster may, for example, process any input (e.g., received at 302) in accordance with stored procedures and/or algorithms to compute and/or calculate values for one or more dependent variables. In the case of an insurance industry analysis, for example, any or all input and/or identified (e.g., via account-based lookup procedures) monetary data points may be processed to compute a value for one or more related variables such as "account size" (e.g., a qualitative and/or range or tier-based metric descriptive of a size of a customer and/or potential customer account, such as based on gross receipts of a business, TIV, etc.). According to some embodiments, the pre-processing may also or alternatively comprise data ranking, sorting, de-duping, and/or other mathematical operations performed on input and/or stored data, e.g., prior to initiating a primary algorithm for calculating a complex variable.

In some embodiments, the method 300 may comprise computing (e.g., by the computational server cluster) a plurality of adjustment factors, at 312. The computing may comprise, for example, (i) computing and/or calculating, for each respective one of the plurality of variables, a difference between a historic value and a current value and (ii) defining, based on the difference between the historic value and the current value and based on at least one of a minimum and a maximum differential threshold, a respective variable adjustment factor. As opposed to calculating a new value for the complex variable utilizing the same complete calculation, formula, and/or algorithm utilized to calculate the prior or historic value for the complex variable (e.g., the prior value identified at 308), for example, a plurality of adjustment factors for a plurality of variables (e.g., variables utilized to calculate the complex variable value) may be derived and applied to the prior value to define a new or updated value for the complex variable. In such a manner, for example, the new/updated value for the complex variable may be non-disruptive, and may accordingly provide benefits to the specific industry in which it is employed.

According to some embodiments, the computing of the plurality of adjustment factors may comprise identifying (e.g., by the computational server cluster and/or by querying the historic data aggregation device in accordance with logic defined by the first one of the different logical pathways) (i) a historic value for each one of the plurality of variables (the historic value comprising a value for the respective one of the plurality of variables for a historic time period) and (ii) a current value for each one of the plurality of variables (the current value comprising a value for the respective one of the plurality of variables for a current time period that is different than the historic time period). The change in value (from the historic to the current time period) for each variable of the plurality of variables, for example, may be calculated and/or otherwise determined. In some embodiments, the computing of the plurality of adjustment factors may also or alternatively comprise computing (e.g., by the computational server cluster and/or by respectively querying each one of a plurality of data tables of a memory array utilizing, respectively, each of the current and historic values for the respective one of the plurality of variables, and in accordance with logic defined by the first one of the different logical pathways) a variable adjustment factor for the complex variable. The change in value of each variable of the plurality of variables may, for example, be utilized to query a decision table to identify an appropriate associated and/or assigned adjustment factor. The values for the adjustment factors may, in some embodiments, be summed, averaged, and/or otherwise mathematically processed to define an overall adjustment factor for the complex variable calculation. According to some embodiments, each variable of the plurality of variables and the respective adjustment factor may be determined by accessing a particular decision table from the array memory array.

In some embodiments, for example, the method 300 (and/or the computing of the plurality of adjustment factors, 312) may comprise identifying (e.g., by the computational server cluster and/or in accordance with logic defined by the first one of the different logical pathways) whether there is an account match, at 314. Data descriptive of a plurality of known accounts and/or customers may be stored and accessed, for example, to determine whether the current transaction involves a known and/or identifiable account, customer, and/or business. In some embodiments, the identifying may comprise querying an account database utilizing input data (e.g., received at 302) and determining that the data matches stored data. In the case that an account match is identified, the method 300 may proceed to actuating third-party rules, at 316. The computational server cluster may, for example, transmit a call (e.g., the query regarding the account match and/or a transmittal of a command) to a third-party server device (e.g., a third-party data acquisition, aggregation, and/or sales device) to execute third-party rules for identifying and/or calculating a current value for a first one of the plurality of variables. In some embodiments, the first one of the plurality of variables may comprise a risk variable, e.g., representing a level of calculated risk associated with the particular transaction, account, customer, business, and/or entity or object.

According to some embodiments, the method 300 may comprise computing (e.g., by the computational server cluster) a value for a first one of the adjustment factors, at 318. In the case that the third-party rules were called at 316, for example, the computing may comprise receiving (e.g., by the computational server cluster) an indication of the current value for the first one of the plurality of variables (e.g., the risk variable). In the case that the account match at 314 does not identify a correlation to stored account, customer, and/or business data, the method may also or alternatively proceed to the computing of the value for first one of the adjustment factors at 318. According to some embodiments, a negative match result may define and/or influence the current value for the first one of the plurality of variables. According to some embodiments, the computing may comprise identifying (e.g., by the computational server cluster and/or by querying the historic data aggregation device in accordance with logic defined by the first one of the different logical pathways) a historic value for the first one of the plurality of variables (e.g., comprising the risk variable). In some embodiments, the current and/or historic values (and/or the difference thereof) for the first one of the plurality of variables may be utilized to initiate a query to a first decision table such as the first one of the plurality of data tables 240*f*-1 of the memory array 240*f*, of FIG. 2 herein. According to some embodiments, the result of the query may define and/or identify the value for the first one of the adjustment factors.

In some embodiments, the method 300 may comprise computing (e.g., by the computational server cluster) a value for a second one of the adjustment factors, at 320. The computing may comprise, for example, identifying (e.g., by the computational server cluster and/or by querying the historic data aggregation device in accordance with logic defined by the first one of the different logical pathways) (i) a historic value for a second one of the plurality of variables (the historic value comprising a value for the second one of the plurality of variables for a historic time period) and (ii) a current value for the second one of the plurality of variables (the current value comprising a value for the second one of the plurality of variables for a current time period that is different than the historic time period). According to some embodiments, the second one of the plurality of variables may comprise a loss variable, e.g., representing an amount of loss experienced by the particular transaction, account, customer, business, and/or entity or object. In some embodiments, the current and/or historic values (and/or the difference thereof) for the second one of the plurality of variables may be utilized to initiate a query to a second decision table such as the second one of the plurality of data tables 240*f*-2 of the memory array 240*f*, of FIG. 2 herein. According to some embodiments, the result of the query may define and/or identify the value for the second one of the adjustment factors.

According to some embodiments, the method 300 may comprise computing (e.g., by the computational server cluster) a value for a third one of the adjustment factors, at 322. The computing may comprise, for example, identifying (e.g., by the computational server cluster and/or by querying the historic data aggregation device in accordance with logic defined by the first one of the different logical pathways) (i) a historic value for a third one of the plurality of variables (the historic value comprising a value for the third one of the plurality of variables for a historic time period) and (ii) a current value for the third one of the plurality of variables (the current value comprising a value for the third one of the plurality of variables for a current time period that is different than the historic time period). According to some embodiments, the third one of the plurality of variables may comprise a billing experience variable, e.g., representing a billing and/or payment performance for the particular transaction, account, customer, business, and/or entity or object.

In some embodiments, the current and/or historic values (and/or the difference thereof) for the third one of the plurality of variables may be utilized to initiate a query to a third decision table such as the third one of the plurality of data tables 240*f*-3 of the memory array 240*f*, of FIG. 2 herein. According to some embodiments, the result of the query may define and/or identify the value for the third one of the adjustment factors.

In some embodiments, the method 300 may comprise computing (e.g., by the computational server cluster) a value for a fourth one of the adjustment factors, at 324. The computing may comprise, for example, identifying (e.g., by the computational server cluster and/or by querying the historic data aggregation device in accordance with logic defined by the first one of the different logical pathways) (i) a historic value for a fourth one of the plurality of variables (the historic value comprising a value for the fourth one of the plurality of variables for a historic time period) and (ii) a current value for the fourth one of the plurality of variables (the current value comprising a value for the fourth one of the plurality of variables for a current time period that is different than the historic time period). According to some embodiments, the fourth one of the plurality of variables may comprise a characteristics, e.g., representing one of a plurality of real-world and/or physical characteristics of the particular transaction, account, customer, business, and/or entity or object (such as, but not limited to, building age, number of buildings, TIV, tenure, etc.). In some embodiments, the current and/or historic values (and/or the difference thereof) for the fourth one of the plurality of variables may be utilized to initiate a query to a fourth decision table such as the fourth one of the plurality of data tables 240*f*-4 of the memory array 240*f*, of FIG. 2 herein. According to some embodiments, the result of the query may define and/or identify the value for the fourth one of the adjustment factors.

According to some embodiments, the method 300 may comprise computing (e.g., by the computational server cluster and/or by executing the at least one programmatic logic routine defining how the value of the complex variable is computed in accordance with the first one of the different logical pathways) a current (e.g., non-disruptive) value for the complex variable, at 326. In some embodiments, the first one of the different logical pathways may define a formula that modifies the prior/historic value for the complex variable based upon each of the first, second, third, and fourth adjustment factors. Each of the adjustment factors may, for example, be mathematically applied to the prior value of the complex variable to derive, compute, and/or calculate the current value for the complex variable. In some embodiments, due to the adjustment factors being based on the changes in the values for the plurality of variables over time and/or the adjustment or incrementing of the prior value utilizing such factors, the current value of the complex variable may comprise a non-disruptive value. While a change in the value for any particular variables of the plurality of variables may significantly impact the raw calculation of the complex variable utilizing the base formula for calculating thereof, for example, the adjustment factor for such variable and/or the application of the adjustment factor to the previous value for the complex variable may attenuate any changes from the prior/historic value to the current value of the complex variable, leading to reduced possibility of industry disruption due to significant changes in the value of the complex variable.

In some embodiments for example, the method 300 may comprise calculating (e.g., by the computational server cluster and/or utilizing the computed current value for the complex variable as input into a policy rating formula) a new premium, at 328. According to some embodiments, the new premium may comprise an updated, non-disruptive value for a rated premium for an underwriting product. In the case of the insurance industry, for example, and in the case that the complex variable is associated with determining an insurance rate (e.g., premium, deductible, etc.), variable value changes applied to the base formula for the complex variable may result in large variations between the previous rate and the newly-calculated rate. Particularly for renewals of previous policies and/or product offerings, such large variations may be disruptive to the industry—e.g., by discouraging renewal activities and/or otherwise causing pricing variations that are not palatable to customers. Application of the price adjustment factors to the previous rate, however, may significantly reduce or attenuate variable value fluctuations, leading to much more stable or non-disruptive price changes.

Returning to the decision point at 306, in the case that the value for the versioning input variable is indicative of "new business" (or a different second value for the versioning input variable) and the processing is directed down the second logical pathway specially-programmed for "new business", the method 300 may proceed to new business pre-processing, at 330. The computational server cluster may, for example, process any input (e.g., received at 302) in accordance with stored procedures and/or algorithms to compute and/or calculate values for one or more dependent variables. In the case of an insurance industry analysis, for example, any or all input and/or identified (e.g., via account-based lookup procedures) monetary data points may be processed to compute a value for one or more related variables such as "account size" (e.g., a qualitative and/or range or tier-based metric descriptive of a size of a customer and/or potential customer account, such as based on gross receipts of a business, TIV, etc.). According to some embodiments, the pre-processing may also or alternatively comprise data ranking, sorting, de-duping, and/or other mathematical operations performed on input and/or stored data, e.g., prior to initiating a primary algorithm for calculating the complex variable.

In some embodiments, the method 300 may comprise computing (e.g., by the computational server cluster) a plurality of variable values, at 332. A value for the complex variable may be derived, computed, and/or calculated, for example, based on a complete calculation, formula, and/or algorithm utilizing a plurality of variables (e.g., variables utilized to calculate the complex variable value). In some embodiments, these variables may comprise the same variables utilized to calculate the plurality of adjustment factors at 312 (e.g., for "renewal business").

According to some embodiments, the computing of the plurality of variable values may comprise identifying (e.g., by the computational server cluster and/or by querying one or more data tables in accordance with logic defined by the second one of the different logical pathways) a value for each one of the plurality of variables. In some embodiments, for example, the method 300 (and/or the computing of the plurality of variable values, at 332) may comprise identifying (e.g., by the computational server cluster and/or in accordance with logic defined by the second one of the different logical pathways) whether there is an account match, at 334. Data descriptive of a plurality of known accounts and/or customers may be stored and accessed, for example, to determine whether the current transaction involves a known and/or identifiable account, customer, and/or business. In some embodiments, the identifying may comprise querying an account database utilizing input data (e.g., received at 302) and determining that the data matches stored data. In the case that an account match is identified, the method 300 may proceed to the actuating of the third-party rules, at 316. The computational server cluster may, for example, transmit a call (e.g., the query regarding the account match and/or a transmittal of a command) to the third-party server device (e.g., the third-party data acquisition, aggregation, and/or sales device) to execute third-party rules for identifying and/or calculating a current value for a first one of the variables.

According to some embodiments, the method 300 may comprise computing and/or deriving (e.g., by the computational server cluster and/or in accordance with logic defined by the second one of the different logical pathways) a value for the first one of the variables, at 336. In the case that the third-party rules were called at 316, for example, the computing may comprise receiving (e.g., by the computational server cluster) an indication of the value for the first one of the variables (e.g., the risk variable). In the case that the account match at 334 does not identify a correlation to stored account, customer, and/or business data, the method may also or alternatively proceed to the computing of the value for first one of the variables at 336. According to some embodiments, a negative match result may define and/or influence the current value for the first one of the variables. In some embodiments, the first one of the variables may comprise a risk variable, e.g., representing a level of calculated risk associated with the particular transaction, account, customer, business, and/or entity or object.

In some embodiments, the method 300 may comprise computing and/or deriving (e.g., by the computational server cluster and/or in accordance with logic defined by the second one of the different logical pathways) a value for the second one of the variables, at 338. Input and/or stored data may be mathematically proceed, for example, to calculate the value of the second variable. In some embodiments, the second one of the variables may comprise a tier variable, e.g., representing a level, tier, group, and/or categorization associated with the particular transaction, account, customer, business, and/or entity or object.

According to some embodiments, the method 300 may comprise computing and/or deriving (e.g., by the computational server cluster and/or in accordance with logic defined by the second one of the different logical pathways) a base value for the complex variable, at 340. Input, stored data, and/or derived data (e.g., the values of the first and/or second variables) may be mathematically proceed, for example, to calculate the base value of the complex variable, e.g., in accordance with a particular complete formula for calculation of the complex variable.

In some embodiments, the method 300 may comprise identifying, computing, and/or deriving (e.g., by the computational server cluster and/or in accordance with logic defined by the second one of the different logical pathways) a value for a territory adjustment, at 342. The computational server cluster may, for example, query a territory adjustment decision table to derive and/or identify the value for the territory adjustment. In some embodiments, the value for a territory adjustment may be indicative of territorial, regional, and/or otherwise location-based market conditions for the particular industry utilizing the complex variable. The value for the territory adjustment may comprise, for example, a value utilized to adjust the base value of the complex variable to represent adjustments to the formula thereof to account for, e.g., different market conditions affecting different customer and/or product business in different geographic locations (e.g., markets).

According to some embodiments, the method 300 may proceed to computing (e.g., by the computational server cluster and/or by executing the at least one programmatic logic routine defining how the value of the complex variable is computed in accordance with the second one of the different logical pathways) a final value for the complex variable, at 326. In some embodiments, the second one of the different logical pathways may define a formula that modifies the base value for the complex variable based upon the territory adjustment factor. The territory adjustment factor may, for example, be mathematically applied to the base value of the complex variable to derive, compute, and/or calculate the final value for the complex variable. In some embodiments, the method 300 may continue to calculate the premium (e.g., based on the final value of the complex variable), at 328.

Returning to the decision point at 304, in the case that the identified first subset of the plurality of interface components and/or the first subset of the plurality of eligibility categories correspond to a lack of eligibility for data modeling (e.g., such correspondence being stored in the database), the method 300 may proceed to calculate the premium, at 328. In such a case where the input does not qualify for data modeling, for example, the premium (or other industry-specific value) calculated at 328 may be calculated in a manner standard to the given industry. In such an embodiment, the calculated premium (or other value) may not be attenuated or protected from large variable value variations and the value of the complex variable may accordingly be disruptive and/or cause the value of the premium (or other value) to be disruptive to the industry. In the case of the insurance industry, for example, the non-modelled premium calculated at 328 may comprise a premium for renewal business that differs significantly from a premium value for a previous associated policy (e.g., the policy being renewed), which may cause loss of business and/or other undesirable and disruptive results.

Multiple variables and/or values are described herein as being calculated based upon and/or otherwise representative of various historic and/or current time periods. Each historic and/or current time period with respect to any particular variable and/or value may, in some embodiments, be different than other historic and/or current time periods for one or more other variables and/or values. According to some embodiments, any or all of the historic and/or current time periods with respect to any particular variable and/or value may be identical to or comprise a subset of other historic and/or current time periods for one or more other variables and/or values.

Figure 4:
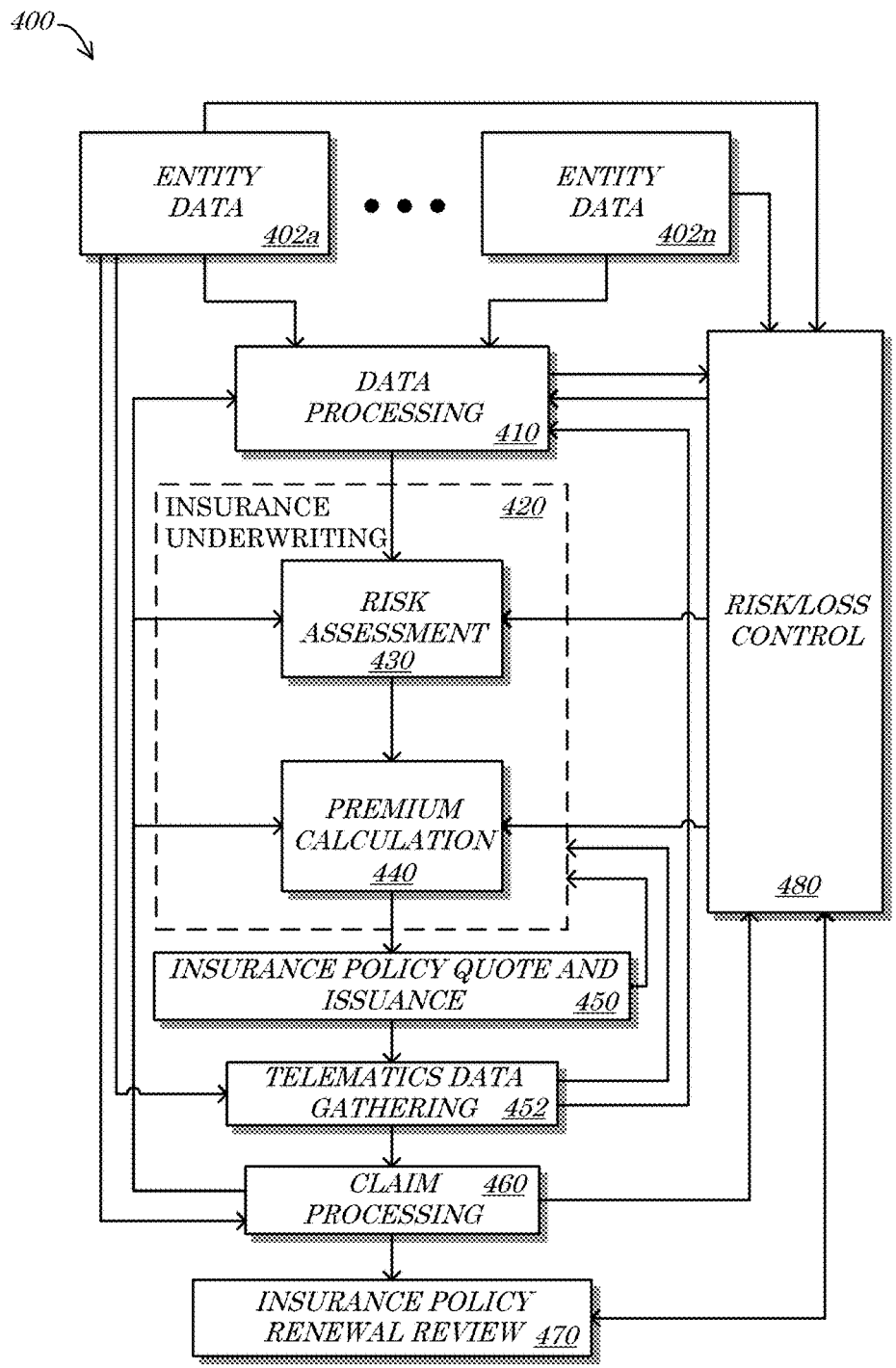
FIG. 4 is a flow diagram of a method according to some embodiments.

Referring now to FIG. 4, a flow diagram of a method 400 according to some embodiments is shown. According to some embodiments, the method 400 may comprise a non-limiting example of an industry-specific application of the non-disruptive complex variable calculations as described herein. In some embodiments, the method 400 may be performed and/or implemented by and/or otherwise associated with one or more specialized and/or specially-programmed computers (e.g., the user devices 102a-n, 202, the third-party device 106, 206, the controller/server devices 110, 210a-b, and/or the transceiver device 212, of FIG. 1 and/or FIG. 2 herein), specialized computers, computer terminals, computer servers, computer systems and/or networks, and/or any combinations thereof (e.g., by one or more multi-threaded and/or multi-core processing units of an insurance company data processing system). In some embodiments, the method 400 may be embodied in, facilitated by, and/or otherwise associated with various input mechanisms and/or interfaces.

According to some embodiments, the method 400 may comprise one or more actions associated with entity data 402a-n. The entity data 402a-n of one or more entities, objects, and/or areas that may be related to and/or otherwise associated with a data processing action for an industry, such as insurance data processing for an insurance territory, account, customer, insurance product, and/or policy, for example, may be determined, calculated, looked-up, retrieved, received, and/or derived. In some embodiments, the entity data 402a-n may be gathered as raw data directly from one or more data sources.

As depicted in FIG. 4, entity data 402a-n from a plurality of data sources may be gathered. In some embodiments, the entity data 402a-n may comprise information indicative of various types of perils, risks, geo-spatial data, business data, customer and/or consumer data, and/or other data that is or becomes useful or desirable for the conducting of various data processing and/or insurance process flow routing and/or versioning (e.g., governing state data, policy effective and/or expiration date data, business classification data, geospatial data, etc.), risk assessment, and/or underwriting processes. The entity data 402a-n may comprise, for example, business location data and/or governing state data, business classification data (e.g., acquired and/or derived from one or more third-party sources), business characteristic data (e.g., annual sales, receipts, payroll, square footage of business operations space), policy and/or desired policy data (e.g., effective date, expiration date, renewal date), etc. The entity data 402a-n may be acquired from any quantity and/or type of available source that is or becomes desired and/or practicable, such as from one or more sensors, databases, and/or third-party devices. In some embodiments, the entity data 402a-n may comprise geospatial and/or geo-coded data relating various peril metrics to one or more geographic locations. In some embodiments, the entity data 402a-n may comprise business classification risk, ranking, and/or scoring data utilized to effectuate business classification processes. In some embodiments, the entity data 402a-n may comprise policy effective date, policy expiration date, and/or governing state data, such as to inform non-disruptive complex variable data processing process flow routing, versioning, and/or calculations, as described herein.

According to some embodiments, the method 400 may also or alternatively comprise one or more actions associated with data processing 410. As depicted in FIG. 4, for example, some or all of the entity data 402a-n may be determined, gathered, transmitted and/or received, and/or otherwise obtained for data processing 410. In some embodiments, data processing 410 may comprise aggregation, analysis, calculation, filtering, conversion, encoding and/or decoding (including encrypting and/or decrypting), sorting, ranking, de-duping, and/or any combinations thereof. In some embodiments, data processing 410 may comprise a determination of appropriate data processing model (e.g., insurance process) flow routing and/or versioning, such as based on preliminary entity data (e.g., entity characteristic and/or location data). The data processing 410 may, for example, be similar to and/or include (in whole or in part) one or more of the computing whether the input corresponds to an eligibility for data modeling at 304, computing whether the input corresponds to a particular transaction type at 306, and/or conducting pre-processing at 310, 330, all from the method 300 of FIG. 3 herein.

According to some embodiments, a processing device may execute specially programmed instructions to process (e.g., the data processing 410) the entity data 402a-n to define one or more business classifications applicable to a business, to select a business classification from a plurality of possible and/or applicable business classifications, and/or to conduct preliminary calculations, such as for supporting metrics or variables, for a non-disruptive complex variable calculation as described herein.

In some embodiments, the method 400 may also or alternatively comprise one or more actions associated with insurance underwriting 420 (or some other result-oriented data processing model for s specific industry). Insurance underwriting 420 may generally comprise any type, variety, and/or configuration of underwriting process and/or functionality that is or becomes known or practicable. Insurance underwriting 420 may comprise, for example, simply consulting a pre-existing rule, criteria, and/or threshold to determine if an insurance product may be offered, underwritten, and/or issued to clients, based on any relevant entity data 402a-n. According to some embodiments, one of a plurality of available versions of underwriting (or other data processing) rules may be selected based on selective and/or modular data processing process flow versioning. One example of an insurance underwriting 420 process may comprise one or more of a risk assessment 430 and/or a premium calculation 440 (e.g., as shown in FIG. 4). In some embodiments, while both the risk assessment 430 and the premium calculation 440 are depicted as being part of an exemplary insurance underwriting 420 procedure, either or both of the risk assessment 430 and the premium calculation 440 may alternatively be part of a different process and/or different type of process (and/or may not be included in the method 400, as is or becomes practicable and/or desirable). Similarly, while both the risk assessment 430 and the premium calculation 440 are depicted as discrete items or objects, either or both of the risk assessment 430 and the premium calculation 440 may comprise a plurality of different items and/or objects, such as different versions of stored rules, logic, and/or process definitions. In some embodiments, the entity data 402a-n may be utilized in the insurance underwriting 420 and/or portions or processes thereof (the entity data 402a-n may be utilized, at least in part for example, to determine, define, identify, recommend, and/or select a coverage type and/or limit and/or type and/or configuration of underwriting product).

In some embodiments, the entity data 402a-n and/or a result of the insurance data processing 410 may be determined and utilized to conduct the risk assessment 430 for any of a variety of purposes. In some embodiments, the risk assessment 430 may be conducted as part of a rating process for determining how to structure an insurance product and/or offering. A "risk rating engine" utilized in an insurance underwriting process may, for example, retrieve a risk metric (e.g., provided as a result of the insurance data processing 410) for input into a calculation (and/or series of calculations and/or a mathematical model; e.g., the risk adjustment at 318 and/or the calculation of the non-disruptive complex variable value at 326, of the method 300 of FIG. 3 herein) to determine a level of risk or the amount of risky behavior likely to be associated with a particular object and/or area (e.g., being associated with one or more particular perils). In some embodiments, the risk assessment 430 may comprise determining that a client views and/or utilizes insurance data (e.g., made available to the client via the insurance company and/or a third-party). In some embodiments, the risk assessment 430 (and/or the method 400) may comprise providing risk control recommendations (e.g., recommendations and/or suggestions directed to reduction of risk, premiums, loss, etc.).

According to some embodiments, the method 400 may also or alternatively comprise one or more actions associated with premium calculation 440 (e.g., which may be part of the insurance underwriting 420). In the case that the method 400 comprises the insurance underwriting 420 process, for example, the premium calculation 440 may be utilized by a "pricing engine" to calculate (and/or look-up or otherwise determine) an appropriate premium to charge for an insurance policy (e.g., based on the calculation of the non-disruptive complex variable value at 326 and/or the premium calculation at 328, of the method 300 of FIG. 3 herein) associated with the object and/or area for which the insurance data 402a-n was collected and for which the risk assessment 430 was performed. In some embodiments, the entity, object, and/or area analyzed may comprise an object and/or area for which an insurance product is sought (e.g., the analyzed object may comprise a property for which a property insurance policy is desired or a business for which business insurance is desired). According to some embodiments, the entity, object, and/or area analyzed may be an object and/or area other than the object and/or area for which insurance is sought (e.g., the analyzed object and/or area may comprise a levy or drainage pump in proximity to the property for which the business insurance policy is desired).

In some embodiments, the "pricing engine" may be defined by a set of data processing instructions. The data processing instructions may, in some embodiments, determine various aspects and/or attributes or results associated with pricing of an insurance product (e.g., for the entity described by the entity data 402a-n). The data processing instructions may, for example, define which entities (e.g., based on the entity data 402a-n) are (i) offered insurance products, (ii) not offered insurance products, (iii) which types of insurance products are offered, and/or (iv) which version of one or more data processing modules (and/or data tables associated therewith) should be utilized to model pricing and/or attributes of offered products (e.g., in accordance with the data model eligibility determination at 304 and/or the transaction/versioning type determination at 306, of the method 300 of FIG. 3 herein).

According to some embodiments, the method 400 may also or alternatively comprise one or more actions associated with insurance policy quote and/or issuance 450. Once a policy has been rated, priced, or quoted (e.g., in accordance with selective and/or modular data processing process flow routing and/or versioning and/or utilizing a non-disruptive value for a complex variable as described herein) and the customer/client has accepted the coverage terms, the insurance company may, for example, bind and issue the policy by hard copy and/or electronically to the client/insured. In some embodiments, the quoted and/or issued policy may comprise a personal insurance policy, such as a property damage and/or liability policy, and/or a business insurance policy, such as a business liability policy, and/or a property damage policy.

In general, a client/customer may visit a website (or a particular version thereof, such as selected based on preliminary entity information) and/or an insurance agent may, for example, provide the needed information about the client and type of desired insurance, and request an insurance policy and/or product (e.g., in accordance with various versions of applicable rules, such as a version automatically selected based on preliminary entity information). According to some embodiments, the insurance underwriting 420 may be performed utilizing information about the potential client and the policy may be issued as a result thereof. Insurance coverage may, for example, be evaluated, rated, priced, and/or sold to one or more clients, at least in part, based on the entity data 402a-n. In some embodiments, an insurance company may have the potential client indicate electronically, on-line, or otherwise whether they have any peril-sensing and/or location-sensing (e.g., telematics) devices (and/or which specific devices they have) and/or whether they are willing to install them or have them installed. In some embodiments, this may be done by check boxes, radio buttons, or other form of data input/selection, on a web page and/or via a mobile device application.

In some embodiments, the method 400 may comprise telematics data gathering, at 452. In the case that a client desires to have telematics data monitored, recorded, and/or analyzed, for example, not only may such a desire or willingness affect policy pricing (e.g., affect the premium calculation 440, such as by comprising one of the plurality of variables utilized to calculate the non-disruptive vale for the complex variable), but such a desire or willingness may also cause, trigger, and/or facilitate the transmitting and/or receiving, gathering, retrieving, and/or otherwise obtaining entity data 402a-n from one or more telematics devices. As depicted in FIG. 4, results of the telematics data gathering at 452 may be utilized to affect the insurance data processing 410, the risk assessment 430, and/or the premium calculation 440 (and/or otherwise may affect the insurance underwriting 420).

According to some embodiments, the method 400 may also or alternatively comprise one or more actions associated with claims 460. In the insurance context, for example, after an insurance product is provided and/or policy is issued (e.g., via the insurance policy quote and issuance 450), and/or during or after telematics data gathering 452, one or more insurance claims 460 may be filed against the product/policy. In some embodiments, such as in the case that a first entity or object associated with the insurance policy is somehow involved with one or more insurance claims 460, the entity data 402a-n of the entity or object or related objects may be gathered and/or otherwise obtained. According to some embodiments, such entity data 402a-n may comprise data indicative of a level of risk of the entity, object, and/or area (or area in which the object was located) at the time of casualty or loss (e.g., as defined by the one or more claims 460). Information on claims 460 may be provided to the data processing 410, risk assessment 430, and/or premium calculation 440 to update, improve, and/or enhance these procedures (e.g., such as by defining a current or updated value for a variable utilized to calculate the non-disruptive value of the complex variable herein) and/or associated software and/or devices. In some embodiments, entity data 402a-n may be utilized to determine, inform, define, and/or facilitate a determination or allocation of responsibility related to a loss (e.g., the entity data 402a-n may be utilized to determine an allocation of weighted liability amongst those involved in the incident(s) associated with the loss).

In some embodiments, the method 400 may also or alternatively comprise insurance policy renewal review 470. Entity data 402a-n (and/or associated business classification data) may be utilized, for example, to determine if and/or how (e.g., via which data processing and/or insurance process flow version) an existing insurance policy (e.g., provided via the insurance policy quote and issuance 450) may be renewed (e.g., in accordance with the first one of the different logical pathways for the "renewals" 308, 310, 312, 314, 316, 318, 320, 322, 324, 326, 328 of the method 300 of FIG. 3 herein). According to some embodiments, such as in the case that a client is involved with and/or in charge of (e.g., responsible for) providing the entity data 402a-n (e.g., such as location data indicative of one or more particular property, building, and/or structure attributes), a review may be conducted to determine if the correct amount, frequency, and/or type or quality of the entity data 402a-n was indeed provided by the client during the original term of the policy. In the case that the entity data 402a-n was lacking, the policy may not, for example, be renewed and/or any discount received by the client for providing the entity data 402a-n may be revoked or reduced. In some embodiments, the client may be offered a discount for having certain sensing devices or being willing to install them or have them installed (or be willing to adhere to certain thresholds based on measurements from such devices). In some embodiments, analysis of the received entity data 402a-n in association with the policy may be utilized to determine if the client conformed to various criteria and/or rules set forth in the original policy. In the case that the client satisfied applicable policy requirements (e.g., as verified by received entity data 402a-n), the policy may be eligible for renewal and/or discounts. In the case that deviations from policy requirements are determined (e.g., based on the entity data 402a-n), the policy may not be eligible for renewal, a different policy may be applicable, and/or one or more surcharges and/or other penalties may be applied.

According to some embodiments, the method 400 may comprise one or more actions associated with risk/loss control 480. Any or all data (e.g., entity data 402a-n and/or other data) gathered as part of a process for claims 460, for example, may be gathered, collected, and/or analyzed to determine how (if at all) one or more of a risk rating engine (e.g., the risk assessment 430), a pricing engine (e.g., the premium calculation 440), the insurance underwriting 420, and/or the data processing 410, should be updated to reflect actual and/or realized risk, costs, and/or other issues associated with the insurance data 402a-n. Results of the risk/loss control 480 may, according to some embodiments, be fed back into the method 400 to refine the risk assessment 430, the premium calculation 440 (e.g., for subsequent insurance queries and/or calculations), the insurance policy renewal review 470 (e.g., a re-calculation of an existing policy for which the one or more claims 460 were filed), and/or the data processing 410 to appropriately scale the output of the risk assessment 430.

In some embodiments, either of the methods 300, 400 of FIG. 3 and/or FIG. 4 may comprise transmitting, providing, and/or outputting a result (not explicitly shown in either FIG. 3 or FIG. 4). The methods 300, 400 may, for example, comprise transmitting (e.g., by the computational server cluster and/or via an interface server and/or transceiver device, and/or via the first electronic network pathway) to a user device, and indication of a computed and/or calculated result such as (i) a determination regarding whether data modeling is available, suggested, or required, (ii) a determination regarding appropriate and/or applicable rule, interface, and/or calculation versions, and/or (iii) one or more results based upon a non-disruptive complex variable calculation, such as a non-disruptive insurance rate or premium. In such a manner, for example, whether data modeling is required or not, whether a first or second version of the data processing model are appropriate for execution, and/or whether specific modules and/or versions of modules are applicable for execution as part of the first one of the different logical pathways, a data processing result applicable to the entity data received as input (e.g., at 302, 402a-n of FIG. 3 and/or FIG. 4 herein) may be output. In some embodiments, the various decision points implemented in the methods 300, 400 may be effectuated by specific data structures that allow for such modularized data processing. An example of such specialized data structures, in specific context of the ongoing example of insurance data processing, is described with reference to FIG. 5 below.

V. Complex Variable Calculation Data Storage Structures

Figure 5:
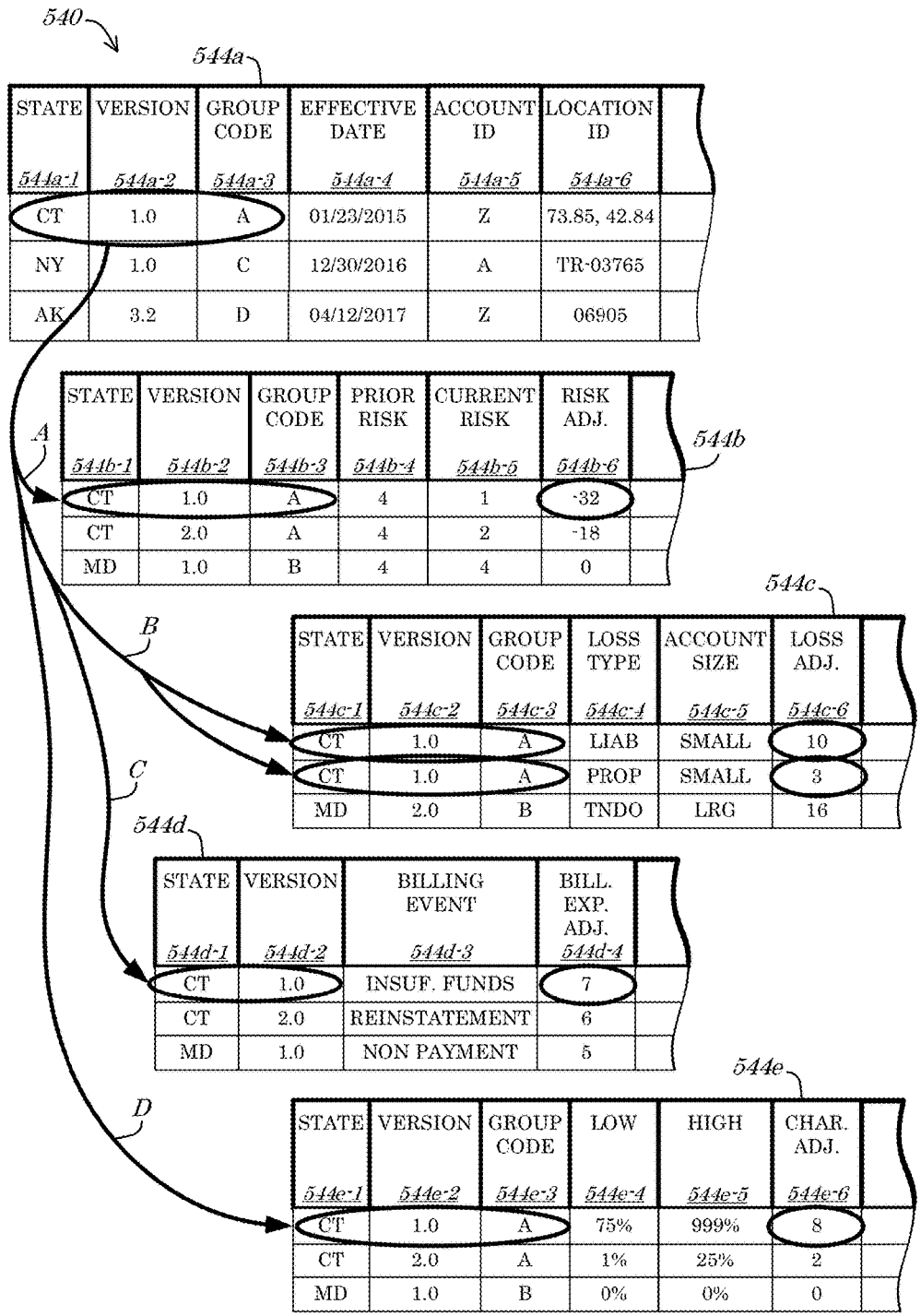
FIG. 5 is a diagram of an example data storage structure according to some embodiments.

Referring to FIG. 5, for example, diagrams of an example data storage structure 540 according to some embodiments are shown. In some embodiments, the data storage structure 540 may comprise a plurality of data tables, such as a transaction table 544a, a first decision table 544b (e.g., a risk table), a second decision table 544c (e.g., a loss table), a third decision table 544d (e.g., a billing experience table), and/or a fourth decision table 544e (e.g., a characteristics table). The data tables 544a-e may, for example, comprise and/or be stored in a memory array and/or may be utilized in an execution of a modular data processing model, such as to calculate a non-disruptive value for a complex variable, as described herein.

The transaction table 544a may comprise, in accordance with some embodiments, a state field 544a-1, a version field 544a-2, a group code field 544a-3, an effective date field 544a-4, an account ID field 544a-5, and/or a location ID field 544a-6. As described herein, the data stored in the transaction table 544a may be utilized to direct and/or route data processing down one or more specific logical pathways, such as by specifying which version of a data model to call or implement and/or which modules within a specific data model version to execute. In such a manner, for example, as data processing requirements change, in many cases such changes may be managed simply by changing some of the data stored in the transaction table 544a, as opposed to requiring time-consuming source code edits, re-compiling, and debugging. In some embodiments, the transaction table 544a may be utilized to direct processing activities to one or more specific data sources and/or tables such as one or more of the decision tables 544b-e depicted in FIG. 5.

The first decision table 544b may comprise, in accordance with some embodiments for example, a state field 544b-1, a version field 544b-2, a group code field 544b-3, a prior risk field 544b-4, a current risk field 544b-5, and/or a risk adjustment field 544b-6. The transaction table 544a may direct processing to one or more of the state field 544b-1, the version field 544b-2, and/or the group code field 544b-3, for example, which may be indexed and may accordingly provide faster processing than previously utilized hard-coded and/or non-modular methods. According to some embodiments, data defining the state, the module version, and/or the group code (e.g., a state and/or industry grouping code—such as for states or other jurisdictions and/or industries that have a shared regulatory environments and/or features) may be utilized to determine, based on a comparison and/or analysis of a historic or prior risk score value (e.g., stored in the prior risk field 544b-4) with a current or updated risk score value (e.g., stored in the current risk field 544b-5) a first or risk-based adjustment factor via the risk adjustment field 544b-6. The prior risk field 544b-4 and/or the current risk field 544b-5 may store, for example, a credit score or ranking, such as determined via a combination of third-party and entity data. In some embodiments, a difference between the prior and historic risk values may be utilized to derive and/or identify the appropriate risk adjustment factor stored in the risk adjustment field 544b-6. The risk adjustment factor may, for example, comprise a value that is utilized to alter, adjust, and/or modify a data processing result, such as a base premium and/or initial risk assessment value (e.g., obtained by execution of a particular version of a data processing model as selected and initiated, as described herein). According to some embodiments, the risk adjustment factor may comprise one of a plurality of factors utilized to modify or update a prior calculated value of a complex variable to derive a non-disruptive current value for the complex variable, as described herein.

In some embodiments, the second decision table 544c may comprise a state field 544c-1, a version field 544c-2, a group code field 544c-3, a loss type field 544c-4, an account size field 544c-5, and/or a loss adjustment field 544c-6. The transaction table 544a may direct processing to one or more of the state field 544c-1, the version field 544c-2, and/or the group code field 544c-3, for example, which may be indexed and may accordingly provide faster processing than previously utilized hard-coded and/or non-modular methods. According to some embodiments, data defining the state, the module version, and/or the group code (e.g., a state and/or industry grouping code—such as for states or other jurisdictions and/or industries that have a shared regulatory environments and/or features) may be utilized to determine, based on a comparison and/or analysis of loss type value (e.g., stored in the loss type field 544c-4) with an account size value (e.g., stored in the account size field 544c-5) a second or loss-based adjustment factor via the loss adjustment field 544c-6. The loss type field 544c-4 and the account size field 544c-5 may store, for example, a category or type of loss indication (e.g., for a loss that has occurred since the original value for the complex variable was calculated) and an account size indication, respectively. In some embodiments, the loss type and/or account size values may be utilized to derive and/or identify the appropriate loss adjustment factor stored in the loss adjustment field 544c-6. The loss adjustment factor may, for example, comprise a value that is utilized to alter, adjust, and/or modify a data processing result, such as a base premium and/or initial risk assessment value (e.g., obtained by execution of a particular version of a data processing model as selected and initiated, as described herein). According to some embodiments, the loss adjustment factor may comprise one of a plurality of factors utilized to modify or update a prior calculated value of a complex variable to derive a non-disruptive current value for the complex variable, as described herein.

According to some embodiments, the third decision table 544d may comprise a state field 544d-1, a version field 544d-2, a billing event field 544d-3, and/or a billing experience adjustment field 544d-4. The transaction table 544a may direct processing to one or more of the state field 544d-1 and/or the version field 544d-2, for example, which may be indexed and may accordingly provide faster processing than previously utilized hard-coded and/or non-modular methods. According to some embodiments, data defining the state and/or the module version may be utilized to determine, based on an analysis of a billing event value (e.g., stored in the billing event type field 544d-3) a third or billing experience-based adjustment factor via the billing experience adjustment field 544d-4. The billing event field 544d-3 may store, for example, a description of and/or a category or type of billing event (e.g., for an undesirable billing and/or payment event that has occurred since the original value for the complex variable was calculated). In some embodiments, the type of billing event may be utilized to derive and/or identify the appropriate billing experience adjustment factor stored in the billing experience adjustment field 544*d*-4. The billing experience adjustment factor may, for example, comprise a value that is utilized to alter, adjust, and/or modify a data processing result, such as a base premium and/or initial risk assessment value (e.g., obtained by execution of a particular version of a data processing model as selected and initiated, as described herein). According to some embodiments, the billing experience adjustment factor may comprise one of a plurality of factors utilized to modify or update a prior calculated value of a complex variable to derive a non-disruptive current value for the complex variable, as described herein.

In some embodiments, the fourth decision table 544*e* may comprise a state field 544*e*-1, a version field 544*e*-2, a group code field 544*e*-3, a "low" field 544*e*-4, a "high" field 544*e*-5, and/or a characteristics adjustment field 544*e*-6. The transaction table 544*a* may direct processing to one or more of the state field 544*e*-1, the version field 544*e*-2, and/or the group code field 544*e*-3, for example, which may be indexed and may accordingly provide faster processing than previously utilized hard-coded and/or non-modular methods. According to some embodiments, data defining the state, the module version, and/or the group code (e.g., a state and/or industry grouping code—such as for states or other jurisdictions and/or industries that have a shared regulatory environments and/or features) may be utilized to determine, based on a comparison and/or analysis of a characteristics value to a "low" value (e.g., stored in the "low" field 544*e*-4) and a "high" value (e.g., stored in the "high" field 544*e*-5) a fourth or characteristics-based adjustment factor via the characteristics adjustment field 544*e*-6. The "low" field 544*e*-4 and the "high" field 544*e*-5 may store, for example, endpoints of a range in which a value for a change in account characteristics (e.g., for a characteristics change that has occurred since the original value for the complex variable was calculated) may fall. In some embodiments, a comparison of a characteristics value change (e.g., a change in number of buildings insured) may be utilized to derive and/or identify the appropriate characteristics adjustment factor stored in the characteristics adjustment field 544*e*-6. The characteristics adjustment factor may, for example, comprise a value that is utilized to alter, adjust, and/or modify a data processing result, such as a base premium and/or initial risk assessment value (e.g., obtained by execution of a particular version of a data processing model as selected and initiated, as described herein). According to some embodiments, the characteristics adjustment factor may comprise one of a plurality of factors utilized to modify or update a prior calculated value of a complex variable to derive a non-disruptive current value for the complex variable, as described herein.

According to some embodiments, any or all adjustment factor values retrieved from the decision tables 544*b-e*, such as resulting from a plurality of tiered and/or staged queries, may be processed to determine a total adjustment factor value. In accordance with the example data depicted in FIG. 5 for example, the adjustment factor values (circled for ease of reference in FIG. 5) stored in each of the risk adjustment field 544*b*-6 (e.g., negative thirty-two (−32)), the loss adjustment field 544*c*-6 (e.g., ten (10) and three (3)), the billing experience adjustment field 544*d*-4 (e.g., seven (7)), and the characteristics adjustment field 544*e*-6 (e.g., eight (8)) may be summed (or otherwise mathematically processed) to derive a total adjustment factor (e.g., negative four (−4)). In some embodiments the total adjustment factor may be applied to a prior, original, previous, and/or historic value of a complex variable to derive a new value for the complex variable. The original value of the complex variable for the example data shown in FIG. 5 may, for example, be adjusted (e.g., utilizing subtraction, addition, multiplication, division, and/or one or more mathematical formulas) by negative four (−4) value units (e.g., points, rank, dollars, etc.) to compute, calculate, derive, and/or otherwise determine or define an updated and non-disruptive value for the complex variable—which may then be utilized, for example, to calculate or determine an updated value for an industry-specific metric such as an insurance premium or rate.

In some embodiments, data processing results, such as insurance premiums and/or risk assessment parameters, may be defined in a modular programmatic fashion utilizing relationships established between two or more of the data tables 544*a-e*. As depicted in the example data storage structure 540, for example, a first relationship "A" may be established between the transaction table 544*a* and the first decision table 544*b*. In some embodiments (e.g., as depicted in FIG. 5), the first relationship "A" may be defined by utilizing the state field 544*a*-1, the version field 544*a*-2, and/or the group code field 544*a*-3 as a data key linking to the state field 544*b*-1, the version field 544*b*-2, and/or the group code field 544*b*-3, respectively. According to some embodiments, the first relationship "A" may comprise any type of data relationship that is or becomes desirable, such as a one-to-many, many-to-many, or many-to-one relationship. In the case that a single result from the risk adjustment field 544*b*-6 is desired, the first relationship "A" may comprise a one-to-one relationship. In such a manner, for example, entity data utilized to compare, query, and/or otherwise process against the transaction table 544*a* may be utilized to determine (i) which version of the first programming module to execute, (ii) whether to execute any version of the first programming module, and/or (iii) a result of the first programming module, such as a risk adjustment value stored in the risk adjustment field 544*b*-6.

According to some embodiments, a second relationship "B" may be established between the transaction table 544*a* and the second decision table 544*c*. In some embodiments (e.g., as depicted in FIG. 5), the second relationship "B" may be defined by utilizing the state field 544*a*-1, the version field 544*a*-2, and/or the group code field 544*a*-3 as a data key linking to the state field 544*c*-1, the version field 544*c*-2, and/or the group code field 544*c*-3, respectively. According to some embodiments, the first relationship "A" may comprise any type of data relationship that is or becomes desirable, such as a one-to-many, many-to-many, or many-to-one relationship. In the case that multiple possible results (e.g., multiple loss events) from the loss adjustment field 544*c*-6 are desired, the second relationship "B" may comprise a one-to-many relationship. In such a manner, for example, entity data utilized to compare, query, and/or otherwise process against the transaction table 544*a* may be utilized to determine (i) which version of the first programming module to execute, (ii) whether to execute any version of the first programming module, and/or (iii) a result of the first programming module, such as a loss adjustment value stored in the loss adjustment field 544*c*-6.

In some embodiments, a third relationship "C" may be established between the transaction table 544*a* and the third decision table 544*d*. In some embodiments (e.g., as depicted in FIG. 5), the third relationship "C" may be defined by utilizing the state field 544*a*-1 and/or the version field 544*a*-2 as a data key linking to the state field 544*d*-1 and/or the version field 544*d*-2, respectively. According to some embodiments, the third relationship "C" may comprise any type of data relationship that is or becomes desirable, such as a one-to-many, many-to-many, or many-to-one relationship. In the case that a single result from the billing experience adjustment field 544*d*-4 is desired, the third relationship "C" may comprise a one-to-one relationship. In such a manner, for example, entity data utilized to compare, query, and/or otherwise process against the transaction table 544*a* may be utilized to determine (i) which version of the first programming module to execute, (ii) whether to execute any version of the first programming module, and/or (iii) a result of the first programming module, such as a billing experience adjustment value stored in the billing experience adjustment field 544*d*-4.

According to some embodiments, a fourth relationship "D" may be established between the transaction table 544*a* and the fourth decision table 544*e*. In some embodiments (e.g., as depicted in FIG. 5), the fourth relationship "D" may be defined by utilizing the state field 544*a*-1, the version field 544*a*-2, and/or the group code field 544*a*-3 as a data key linking to the state field 544*e*-1, the version field 544*e*-2, and/or the group code field 544*e*-3, respectively. According to some embodiments, the fourth relationship "D" may comprise any type of data relationship that is or becomes desirable, such as a one-to-many, many-to-many, or many-to-one relationship. In the case that a single result from the characteristics adjustment field 544*e*-6 is desired, the fourth relationship "D" may comprise a one-to-one relationship. In such a manner, for example, entity data utilized to compare, query, and/or otherwise process against the transaction table 544*a* may be utilized to determine (i) which version of the first programming module to execute, (ii) whether to execute any version of the first programming module, and/or (iii) a result of the first programming module, such as a characteristics adjustment value stored in the characteristics adjustment field 544*e*-6.

In some embodiments, fewer or more data fields than are shown may be associated with the data tables 544*a-e*. Only a portion of one or more databases and/or other data stores is necessarily shown in FIG. 5, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

VI. Complex Variable Calculation Apparatus and Articles of Manufacture

Figure 6:
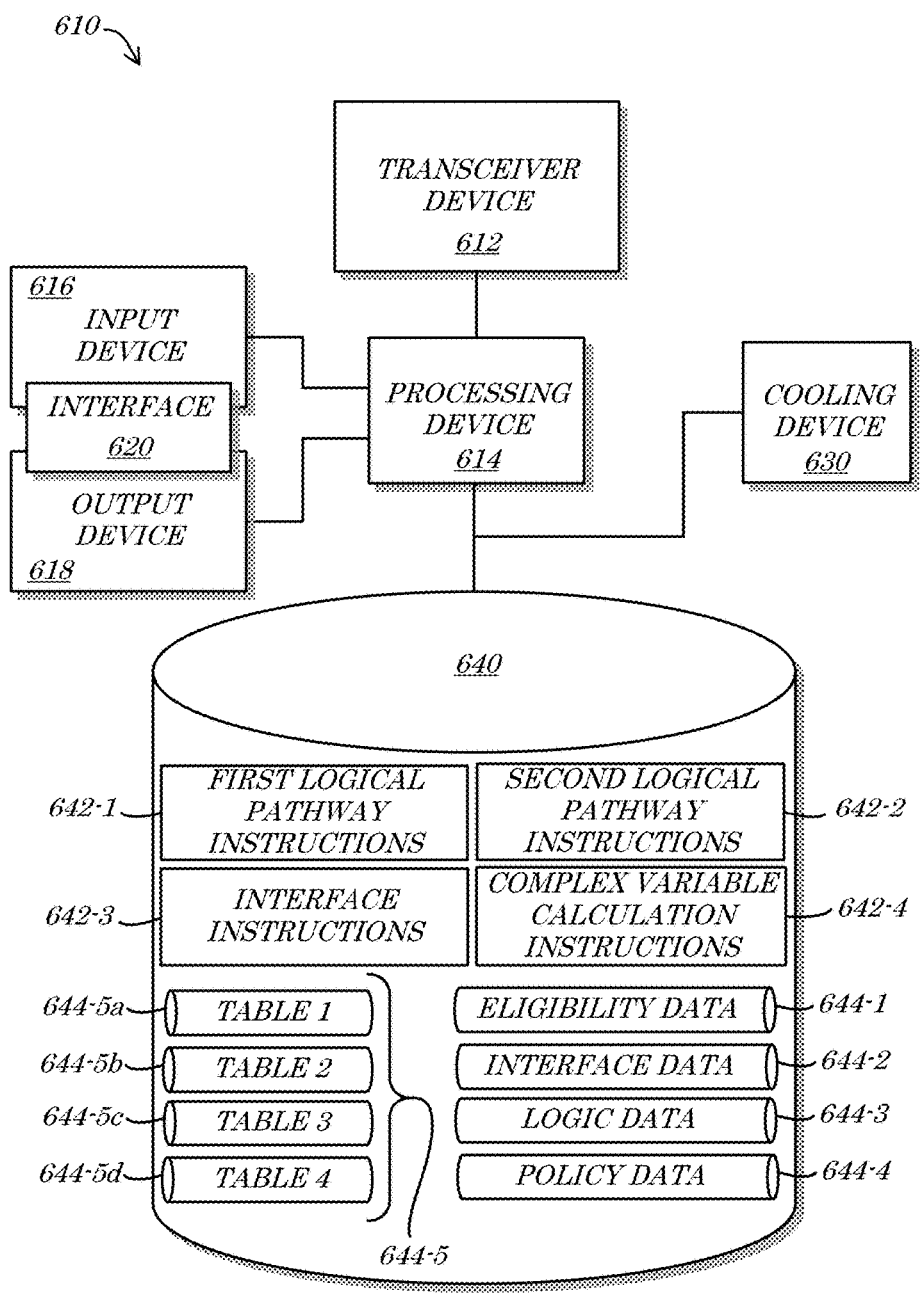
FIG. 6 is a block diagram of an apparatus according to some embodiments.
Figure 7A:
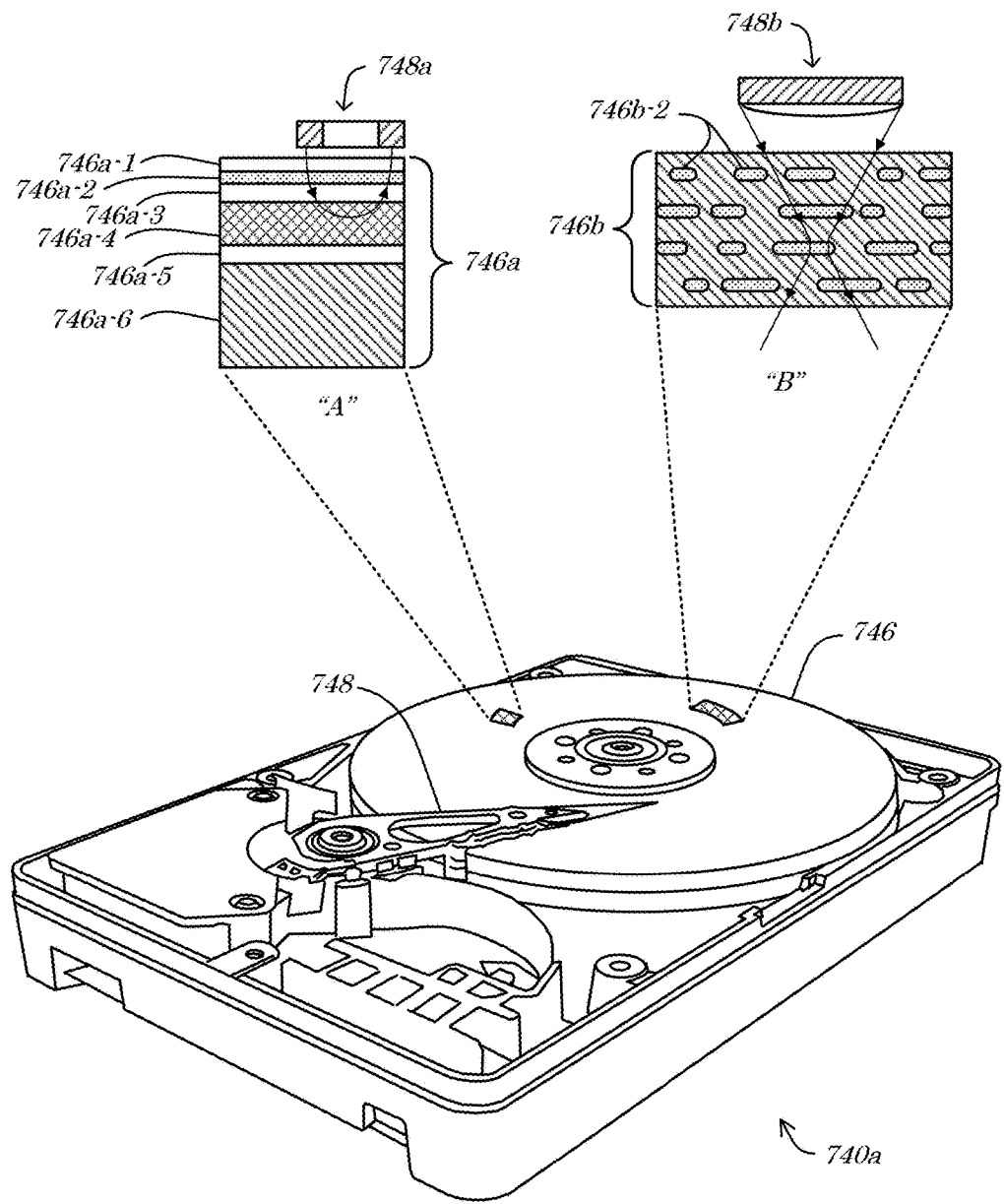
FIG. 7A, FIG. 7B, FIG. 7C, FIG. 7D, and FIG. 7E are perspective diagrams of exemplary data storage devices according to some embodiments.
Figure 7B:
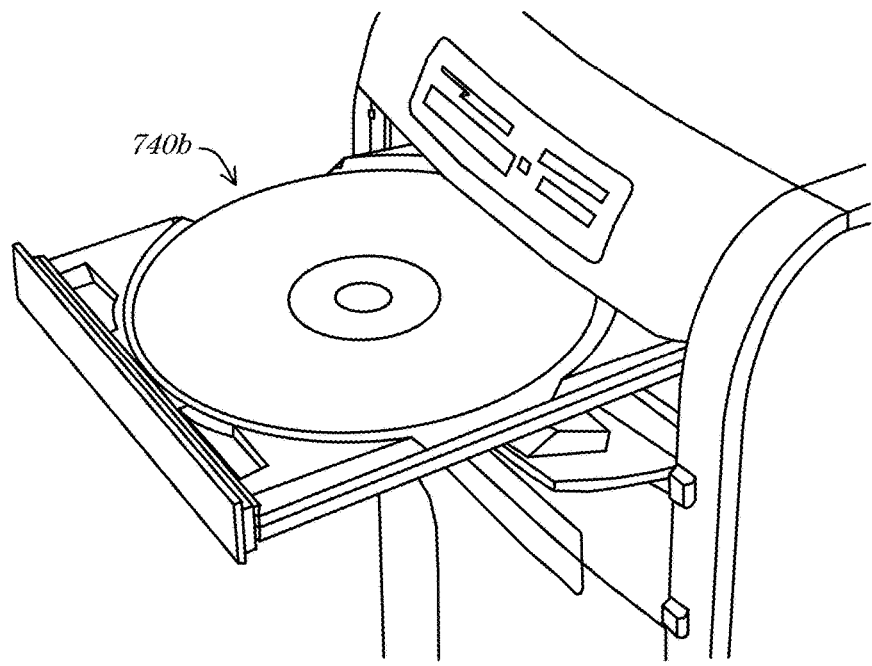
Figure 7C:
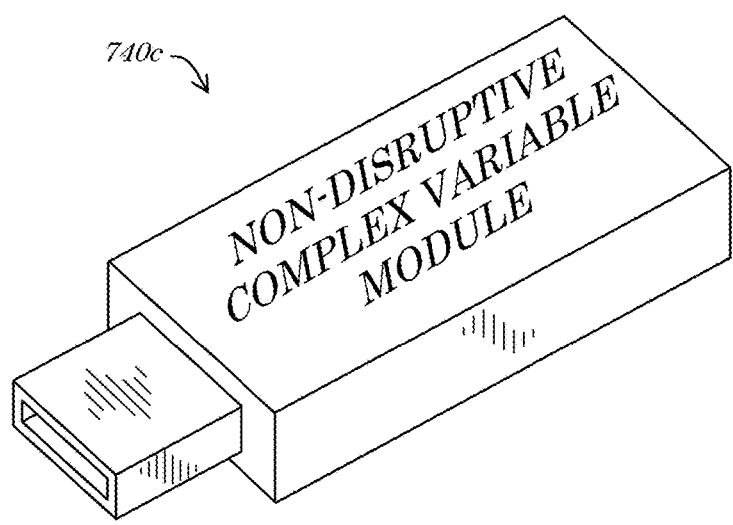
Figure 7D:
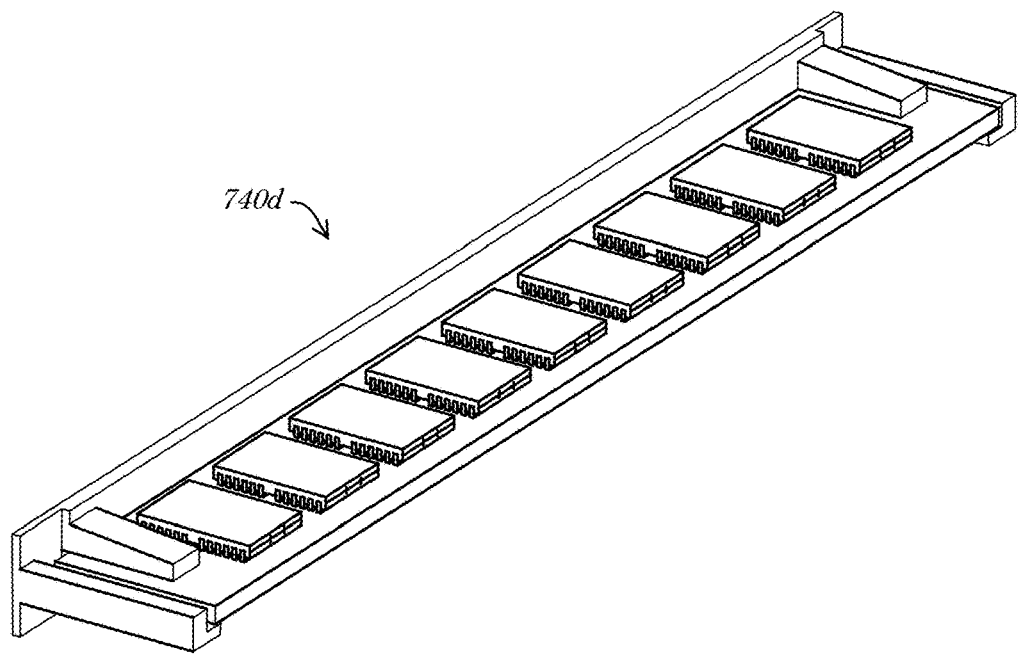
Figure 7E:
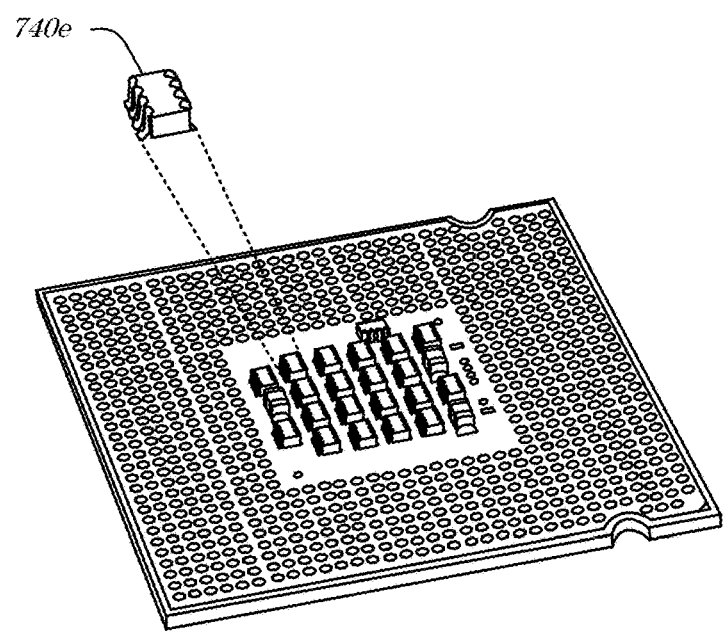

Turning to FIG. 6, a block diagram of an apparatus 610 according to some embodiments is shown. In some embodiments, the apparatus 610 may be similar in configuration and/or functionality to any of the user devices 102*a-n*, 202, the third-party devices 106, 206, and/or the controller devices/servers 110, 210*a-b* of FIG. 1 and/or FIG. 2 herein, and/or may otherwise comprise a portion of the systems 100, 200 of FIG. 1 and/or FIG. 2 herein. The apparatus 610 may, for example, execute, process, facilitate, and/or otherwise be associated with the methods 300, 400 described in conjunction with FIG. 3 and/or FIG. 4 herein, and/or one or more portions or combinations thereof. In some embodiments, the apparatus 610 may comprise a transceiver device 612, one or more processing devices 614, an input device 616, an output device 618, an interface 620, a cooling device 630, and/or a memory device 640 (storing various programs and/or instructions 642 and data 644). According to some embodiments, any or all of the components 612, 614, 616, 618, 620, 630, 640, 642, 644 of the apparatus 610 may be similar in configuration and/or functionality to any similarly named and/or numbered components described herein. Fewer or more components 612, 614, 616, 618, 620, 630, 640, 642, 644 and/or various configurations of the components 612, 614, 616, 618, 620, 630, 640, 642, 644 may be included in the apparatus 610 without deviating from the scope of embodiments described herein.

In some embodiments, the transceiver device 612 may comprise any type or configuration of bi-directional electronic communication device that is or becomes known or practicable. The transceiver device 612 may, for example, comprise a Network Interface Card (NIC), a telephonic device, a cellular network device, a router, a hub, a modem, and/or a communications port or cable. In some embodiments, the transceiver device 612 may be coupled to provide data to a user device (not shown in FIG. 6), such as in the case that the apparatus 610 is utilized to provide a data processing interface (e.g., the interface 620) to a user and/or to provide modular data processing results, such as based on non-disruptive complex variable values, as described herein. The transceiver device 612 may, for example, comprise a cellular telephone network transmission device that sends signals indicative of modular data processing interface components and/or data processing result-based commands to a user handheld, mobile, and/or telephone device. According to some embodiments, the transceiver device 612 may also or alternatively be coupled to the processing device 614. In some embodiments, the transceiver device 612 may comprise an IR, RF, Bluetooth™, and/or Wi-Fi® network device coupled to facilitate communications between the processing device 614 and another device (such as a user device and/or a third-party device; not shown in FIG. 6).

According to some embodiments, the processing device 614 may be or include any type, quantity, and/or configuration of electronic and/or computerized processor that is or becomes known. The processing device 814 may comprise, for example, an Intel® IXP 2800 network processor or an Intel® XEON™ Processor coupled with an Intel® E7501 chipset. In some embodiments, the processing device 614 may comprise multiple, cooperative, and/or inter-connected processors, microprocessors, and/or micro-engines (e.g., a computational processing device and/or server cluster). According to some embodiments, the processing device 614 (and/or the apparatus 610 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, a PDU, and/or Uninterruptible Power Supply (UPS) device (none of which are shown in FIG. 6).

In some embodiments, the input device 616 and/or the output device 618 are communicatively coupled to the processing device 614 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a user, such as an insurance company analyzing and processing insurance rate quote requests, as described herein). The output device 618 may, according to some embodiments, comprise a display screen and/or other practicable output component and/or device. The output device 618 may, for example, provide a modular data processing interface such as the interface 620 to a user (e.g., via a website). In some embodiments, the interface 620 may comprise portions and/or components of either or both of the input device 616 and the output device 618. According to some embodiments, the input device 616 and/or the output device 618 may, for example, comprise and/or be embodied in an input/output and/or single device such as a touch-screen monitor (e.g., that enables both input and output via the interface 620).

In some embodiments, the apparatus 610 may comprise the cooling device 630. According to some embodiments, the cooling device 630 may be coupled (physically, thermally, and/or electrically) to the processing device 614 and/or to the memory device 640. The cooling device 630 may, for example, comprise a fan, heat sink, heat pipe, radiator, cold plate, and/or other cooling component or device or combinations thereof, configured to remove heat from portions or components of the apparatus 610.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of first logical pathway instructions 642-1, second logical pathway instructions 642-2, interface instructions 642-3, complex variable calculation instructions 642-4, eligibility data 644-1, interface data 644-2, logic data 644-3, policy data 644-4, and/or decision table data 644-5 (e.g., a first decision table 644-5a, a second decision table 644-5b, a third decision table 644-5c, and/or a fourth decision table 644-5d. In some embodiments, the first logical pathway instructions 642-1, second logical pathway instructions 642-2, interface instructions 642-3, complex variable calculation instructions 642-4, eligibility data 644-1, interface data 644-2, logic data 644-3, policy data 644-4, and/or decision table data 644-5 may be utilized by the processing device 614 to provide output information via the output device 618 and/or the transceiver device 612.

According to some embodiments, the first logical pathway instructions 642-1 may be operable to cause the processing device 614 to process eligibility data 644-1, interface data 644-2, logic data 644-3, policy data 644-4, and/or decision table data 644-5. Eligibility data 644-1, interface data 644-2, logic data 644-3, policy data 644-4, and/or decision table data 644-5 received via the input device 616 and/or the transceiver device 612 may, for example, be analyzed, sorted, filtered, decoded, decompressed, ranked, scored, plotted, and/or otherwise processed by the processing device 614 in accordance with the first logical pathway instructions 642-1. In some embodiments, eligibility data 644-1, interface data 644-2, logic data 644-3, policy data 644-4, and/or decision table data 644-5 may be fed (e.g., input) by the processing device 614 through one or more mathematical and/or statistical formulas and/or models in accordance with the first logical pathway instructions 642-1 to provide a data processing result based on a first version of a data processing model, such as a first version of an insurance product risk analysis and/or pricing model (e.g., the "renewals" processing pathway as depicted as part of the method 300 of FIG. 3 herein), in accordance with embodiments described herein.

In some embodiments, the second logical pathway instructions 642-2 may be operable to cause the processing device 614 to process eligibility data 644-1, interface data 644-2, logic data 644-3, policy data 644-4, and/or decision table data 644-5. Eligibility data 644-1, interface data 644-2, logic data 644-3, policy data 644-4, and/or decision table data 644-5 received via the input device 616 and/or the transceiver device 612 may, for example, be analyzed, sorted, filtered, decoded, decompressed, ranked, scored, plotted, and/or otherwise processed by the processing device 614 in accordance with the second logical pathway instructions 642-2. In some embodiments, eligibility data 644-1, interface data 644-2, logic data 644-3, policy data 644-4, and/or decision table data 644-5 may be fed (e.g., input) by the processing device 614 through one or more mathematical and/or statistical formulas and/or models in accordance with the second logical pathway instructions 642-2 to provide a data processing result based on a second version of a data processing model, such as a second version of an insurance product risk analysis and/or pricing model (e.g., the "new business" processing pathway as depicted as part of the method 300 of FIG. 3 herein), in accordance with embodiments described herein. Further as described herein, the first logical pathway instructions 642-1 and the second logical pathway instructions 642-2 may be selectively executed, e.g., based on the eligibility data 644-1 and the logic data 644-3 (e.g., based on the eligibility database 240a of FIG. 2 herein).

According to some embodiments, the interface instructions 642-3 may be operable to cause the processing device 614 to process eligibility data 644-1, interface data 644-2, logic data 644-3, policy data 644-4, and/or decision table data 644-5. Eligibility data 644-1, interface data 644-2, logic data 644-3, policy data 644-4, and/or decision table data 644-5 received via the input device 616 and/or the transceiver device 612 may, for example, be analyzed, sorted, filtered, decoded, decompressed, ranked, scored, plotted, and/or otherwise processed by the processing device 614 in accordance with the interface instructions 642-3. In some embodiments, eligibility data 644-1, interface data 644-2, logic data 644-3, policy data 644-4, and/or decision table data 644-5 may be fed (e.g., input) by the processing device 614 through one or more mathematical and/or statistical formulas and/or models in accordance with the interface instructions 642-3 to provide one or more selectively-identified and/or utilized interface components such as from the interface data 644-2 (e.g., based on data from the interface database 240b of FIG. 2 herein) and/or to generate and/or provide the interface 620, in accordance with embodiments described herein.

In some embodiments, the complex variable calculation instructions 642-4 may be operable to cause the processing device 614 to process eligibility data 644-1, interface data 644-2, logic data 644-3, policy data 644-4, and/or decision table data 644-5. Eligibility data 644-1, interface data 644-2, logic data 644-3, policy data 644-4, and/or decision table data 644-5 received via the input device 616 and/or the transceiver device 612 may, for example, be analyzed, sorted, filtered, decoded, decompressed, ranked, scored, plotted, and/or otherwise processed by the processing device 614 in accordance with the complex variable calculation instructions 642-4. In some embodiments, eligibility data 644-1, interface data 644-2, logic data 644-3, policy data 644-4, and/or decision table data 644-5 may be fed (e.g., input) by the processing device 614 through one or more mathematical and/or statistical formulas and/or models in accordance with the complex variable calculation instructions 642-4 to provide a data processing result based on one or more versions of a complex variable calculation and/or formula, as described herein. In the case of the ongoing example of the insurance industry rate and/or premium calculation, for example, the complex variable calculation instructions 642-4 may comprise data defining a base or complete complex variable calculation (e.g., a "new business" logical pathway) and/or data defining a non-disruptive complex variable calculation (e.g., a "renewal" logical pathway) that utilizes the decision table data 644-5, as described herein.

Any or all of the exemplary instructions 642 and data types 644 described herein and other practicable types of data may be stored in any number, type, and/or configuration of memory devices that is or becomes known. The memory device 640 may, for example, comprise one or more data tables or files (e.g., the example data tables 544a-d of FIG. 5 herein), databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated). According to some embodiments, the apparatus 610 may comprise a system and/or a portion of a system that may, for example, include additional devices and/or objects, local or remote, than are depicted in FIG. 6. The apparatus 610 may comprise, for example, a system for utilizing user input to drive multi-tiered queries of a memory array (e.g., the memory device 640 and/or the decision table data 644-5) to compute a value for a complex variable.

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data such as the first logical pathway instructions 642-1, second logical pathway instructions 642-2, interface instructions 642-3, complex variable calculation instructions 642-4, eligibility data 644-1, interface data 644-2, logic data 644-3, policy data 644-4, and/or decision table data 644-5, each of which is described in reference to FIG. 6 herein. In some embodiments, instructions stored on the data storage devices 740a-e may, when executed by one or more threads, cores, and/or processors (such as the processing device 614 of FIG. 6), cause the implementation of and/or facilitate the methods 300, 400 described in conjunction with FIG. 3 and/or FIG. 4 herein, and/or portions or combinations thereof.

According to some embodiments, a first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 746a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, a second data storage device 740b may comprise a CD, CD-ROM, DVD, Blu-Ray™ Disc, and/or other type of optically-encoded disk and/or other storage medium that is or becomes know or practicable. In some embodiments, a third data storage device 740c may comprise a USB keyfob, dongle, and/or other type of flash memory data storage device that is or becomes know or practicable. In some embodiments, a fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, a fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols.

For a more exhaustive list of protocols, the term "network" is defined herein and includes many exemplary protocols that are also applicable here.

VII. Additional Terms and Rules of Interpretation

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "module". As utilized herein, the term "module" may generally be descriptive of any combination of hardware, electronic circuitry and/or other electronics (such as logic chips, logical gates, and/or other electronic circuit elements or components), hardware (e.g., physical devices such as hard disks, solid-state memory devices, and/or computer components such as processing units or devices), firmware, and/or software or microcode.

Some embodiments described herein are associated with a "user device", a "remote device", or a "network device". As used herein, each of a "user device" and a "remote device" is a subset of a "network device". The "network device", for example, may generally refer to any device that can communicate via a network, while the "user device" may comprise a network device that is owned and/or operated by or otherwise associated with a particular user (and/or group of users—e.g., via shared login credentials and/or usage rights), and while a "remote device" may generally comprise a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. User, remote, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

In some embodiments, one or more specialized machines such as a computerized processing device, a server, a remote terminal, and/or a customer device may implement the various practices described herein. A computer system of an insurance quotation and/or risk analysis processing enterprise may, for example, comprise various specialized computers that interact to analyze, process, and/or transform data in a modular fashion as described herein. In some embodiments, such modular data processing may provide various advantages such as reducing the number and/or frequency of data calls to data storage devices, which may accordingly increase processing speeds for instances of data processing model executions. As the modular approach detailed herein also allows for storage of a single, modular set of programming code as opposed to multiple complete version of code having variance therein, the taxation on memory resources for a data processing system may also be reduced.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled, but not claimed in the present application.

What is claimed is:

1. A system for utilizing user input to drive multi-tiered queries of a memory array to compute a value for a complex variable, comprising:
   a data transceiver device communicatively coupled to a first electronic network pathway;
   a historic data aggregation device storing data defining values for each of a plurality of variables in correlation with specific historic time periods;
   a memory array comprising a plurality of data tables, each data table storing data defining a relationship between a specific value for one of the plurality of variables and a corresponding variable adjustment factor;
   a computational server cluster communicatively coupled to a second electronic network pathway, the computational server cluster comprising a plurality of cooperative processing units, and the computational server cluster being in communication with the data transceiver device and each of the historic data aggregation device and the memory array; and
   a computational logic data storage device in communication with the computational server cluster, the computational logic data storage device storing (i) data correlating a plurality of versioning input variable values and different logical pathways and (ii) at least one programmatic logic routine defining how the value of the complex variable is computed in accordance with one or more of the different logical pathways, wherein execution of the at least one programmatic logic routine by the computational server cluster, results in:
      receiving, by the data transceiver device and from a remote user device via the first electronic network pathway, information defining a value for a versioning input variable;
      routing, by the data transceiver device and to the computational server cluster, the information defining the value for the versioning input variable;
      comparing, by the computational server cluster, the information defining the value for the versioning input variable with the data stored in the computational logic data storage device that correlates the plurality of versioning input variable values and different logical pathways;
      identifying, by the computational server cluster and based on the comparing, a first one of the different logical pathways that correlates to the information defining the value for the versioning input variable;
      identifying, by the computational server cluster and by querying the historic data aggregation device in accordance with logic defined by the first one of the different logical pathways, a historic value for the complex variable;
      identifying, by the computational server cluster and by querying the historic data aggregation device in accordance with logic defined by the first one of the different logical pathways, (i) a historic value for each one of the plurality of variables, the historic value comprising a value for the respective one of the plurality of variables for a historic time period, and (ii) a current value for each one of the plurality of variables, the current value comprising a value for the respective one of the plurality of variables for a current time period that is different than the historic time period;
      computing, by the computational server cluster and by respectively querying each one of the plurality of data tables of the memory array utilizing, respectively, each of the current and historic values for the respective one of the plurality of variables, and in accordance with logic defined by the first one of the different logical pathways, a variable adjustment factor for the complex variable;
      computing, by the computational server cluster and by executing the at least one programmatic logic routine defining how the value of the complex variable is computed in accordance with the first one of the different logical pathways, wherein the first one of the different logical pathways defines a formula that modifies the historic value for the complex variable based upon each of the computed variable adjustment factors, a current value for the complex variable;
      transmitting, by the computational server cluster and to the data transceiver device, a signal indicative of the computed current value for the complex variable; and
      providing, by the data transceiver device and to the remote user device via the first electronic network pathway, the data indicative of the computed current value for the complex variable.

2. The system of claim 1, wherein the computing of each of the variable adjustment factors for the complex variable, further comprises:
   computing, for each respective one of the plurality of variables, a difference between the historic value and the current value; and
   defining, based on the difference between the historic value and the current value and based on at least one of a minimum and a maximum differential threshold, the respective variable adjustment factor.

3. The system of claim 1, wherein the plurality of variables comprises each of: (i) a risk variable, (ii) a loss variable, (iii) a billing experience variable, and (iv) a characteristics variable.

4. The system of claim 1, wherein each of the historic time periods comprises a time period spanning a single previous year.

5. The system of claim 1, wherein the value of the versioning input variable indicates one of a request for a new policy or a renewal of a previous policy.

6. The system of claim 1, wherein the computing of the current value for the complex variable, further comprises:
   calculating, utilizing the computed current value for the complex variable as input into a policy rating formula, a rated premium value.

7. A system for utilizing user input to drive multi-tiered queries of a memory array to compute a value for a complex variable, comprising:
   a data transceiver device communicatively coupled to a first electronic network pathway;
   at least one interface generation device in communication with the data transceiver;
   a historic data aggregation device storing data defining values for each of a plurality of variables in correlation with specific time periods in the past;
   a memory array comprising a plurality of data tables, each data table storing data defining a relationship between a specific value for one of the plurality of variables and a corresponding variable adjustment factor;

a computational server cluster communicatively coupled to a second electronic network pathway, the computational server cluster comprising a plurality of cooperative processing units, and the computational server cluster being in communication with the interface generation device and each of the historic data aggregation device and the memory array; and a computational logic data storage device in communication with the computational server cluster, the computational logic data storage device storing (i) data correlating a plurality of versioning input variable values and different logical pathways and (ii) at least one programmatic logic routine defining how the value of the complex variable is computed in accordance with one or more of the different logical pathways, wherein execution of the at least one programmatic logic routine by the computational server cluster, results in:

receiving, by the data transceiver device and from a remote user device via the first electronic network pathway, information defining a value for a versioning input variable;

routing, by the data transceiver device and to the at least one interface generation device, the information defining the value for the versioning input variable;

transmitting, by the at least one interface generation device and to the computational server cluster, the information defining the value for the versioning input variable;

comparing, by the computational server cluster, the information defining the value for the versioning input variable with the data stored in the computational logic data storage device that correlates the plurality of versioning input variable values and different logical pathways;

identifying, by the computational server cluster and based on the comparing, a first one of the different logical pathways that correlates to the information defining the value for the versioning input variable;

identifying, by the computational server cluster and by querying the historic data aggregation device in accordance with logic defined by the first one of the different logical pathways, a historic value for the complex variable;

determining, by the computational server cluster and by querying the historic data aggregation device in accordance with logic defined by the first one of the different logical pathways, a plurality of adjustment factors;

computing, by the computational server cluster and by executing the at least one programmatic logic routine defining how the value of the complex variable is computed in accordance with the first one of the different logical pathways, wherein the first one of the different logical pathways defines a formula that modifies the historic value for the complex variable based upon each of the plurality of adjustment factors, a current value for the complex variable;

transmitting, by the computational server cluster and to the at least one interface generation device, a signal indicative of the computed current value for the complex variable;

transmitting, by the at least one interface generation device and to the data transceiver device, data indicative of the computed current value for the complex variable; and providing, by the data transceiver device and to the remote user device via the first electronic network pathway, the data indicative of the computed current value for the complex variable.

8. The system of claim 7, wherein determining the plurality of adjustment factors comprises:

identifying, by the computational server cluster and by querying a third party data acquisition device in accordance with logic defined by the first one of the different logical pathways, a current value for a first one of the plurality of variables comprising a risk variable;

identifying, by the computational server cluster and by querying the historic data aggregation device in accordance with logic defined by the first one of the different logical pathways, a historic value for the first one of the plurality of variables comprising the risk variable;

computing, by the computational server cluster and by querying a first one of the plurality of data tables of the memory array utilizing each of the current and historic values for the first one of the plurality of variables comprising the risk variable, and in accordance with logic defined by the first one of the different logical pathways, a first adjustment factor for the complex variable;

identifying, by the computational server cluster and by querying the historic data aggregation device in accordance with logic defined by the first one of the different logical pathways, (i) a historic value for a second one of the plurality of variables comprising a loss variable, the historic value comprising a value for the second one of the plurality of variables comprising the loss variable for a historic time period, and (ii) a current value for the second one of the plurality of variables comprising the loss variable, the current value comprising a value for the second one of the plurality of variables comprising the loss variable for a current time period that is different than the historic time period;

computing, by the computational server cluster and by querying a second one of the plurality of data tables of the memory array utilizing each of the current and historic values for the second one of the plurality of variables comprising the loss variable, and in accordance with logic defined by the first one of the different logical pathways, a second adjustment factor for the complex variable;

identifying, by the computational server cluster and by querying the historic data aggregation device in accordance with logic defined by the first one of the different logical pathways, (i) a historic value for a third one of the plurality of variables comprising a billing experience variable, the historic value comprising a value for the third one of the plurality of variables comprising the billing experience variable for a historic time period, and (ii) a current value for the third one of the plurality of variables comprising the billing experience variable, the current value comprising a value for the third one of the plurality of variables comprising the billing experience variable for a current time period that is different than the historic time period;

computing, by the computational server cluster and by querying a third one of the plurality of data tables of the memory array utilizing each of the current and historic values for the third one of the plurality of variables comprising the billing experience variable, and in accordance with logic defined by the first one of the different logical pathways, a third adjustment factor for the complex variable;

identifying, by the computational server cluster and by querying the historic data aggregation device in accordance with logic defined by the first one of the different logical pathways, (i) a historic value for a fourth one of the plurality of variables comprising a characteristics variable, the historic value comprising a value for the fourth one of the plurality of variables comprising the characteristics variable for a historic time period, and (ii) a current value for the fourth one of the plurality of variables comprising the characteristics variable, the current value comprising a value for the fourth one of the plurality of variables comprising the characteristics variable for a current time period that is different than the historic time period; and computing, by the computational server cluster and by querying a fourth one of the plurality of data tables of the memory array utilizing each of the current and historic values for the fourth one of the plurality of variables comprising the characteristics variable, and in accordance with logic defined by the first one of the different logical pathways, a fourth adjustment factor for the complex variable.

9. The system of claim 7, wherein the interface generation device comprises a web server.

10. The system of claim 7, further comprising:
a mark-up language memory storage device in communication with the at least one interface generation device, the mark-up language memory storage device storing data defining a plurality of interface components; and
an eligibility verification memory storage device in communication with the at least one interface generation device, the eligibility verification memory storage device storing data correlating a plurality of eligibility input variables and different subsets of the plurality of interface components.

11. The system of claim 10, wherein the execution of the at least one programmatic logic routine by the computational server cluster, further results in:
receiving, by the data transceiver device and from the remote user device via the first electronic network pathway, information defining a value for an eligibility input variable;
routing, by the data transceiver device and to the at least one interface generation device, the information defining the value for the eligibility input variable;
identifying, by the at least one interface generation device and by querying the eligibility verification memory storage device utilizing the value for the eligibility input variable, a corresponding first subset of the plurality of interface components;
retrieving, by the at least one interface generation device and by querying the mark-up language memory storage device utilizing information identifying the first subset of the plurality of interface components, corresponding data defining the first subset of the plurality of interface components;
transmitting, by the at least one interface generation device and to the data transceiver device, the data defining the first subset of the plurality of interface components; and
providing, by the data transceiver device and to the remote user device via the first electronic network pathway, the data defining the first subset of the plurality of interface components, wherein implementation of the first subset of the plurality of interface components to generate a graphical user interface on the remote user device causes a presentation, to the user, of a first interactive input mechanism which prompts the user to enter the value for the versioning input variable.

12. The system of claim 11, wherein the information defining the value for the versioning input variable is received via input entered into the first interactive input mechanism.

13. The system of claim 7, wherein each of the historic time periods comprises a time period spanning a single previous year.

14. The system of claim 7, wherein the value of the versioning input variable indicates one of a request for a new policy and a renewal of a previous policy.

15. The system of claim 7, wherein the computing of the current value for the complex variable, further comprises:
calculating, utilizing the computed current value for the complex variable as input into a policy rating formula, a rated premium value.

* * * * *